United States Patent [19]

Barkey

[11] 4,101,326

[45] Jul. 18, 1978

[54] PROCESS FOR MAKING STABILIZED POLYESTERS USED IN RADIATION-SENSITIVE COMPOSITIONS FOR LITHOGRAPHIC PLATES HAVING IMPROVED WEAR LIFE INCLUDING HINDERED PHENOLS AND PHOSPHORIC ACID ESTERS

[75] Inventor: Kenneth T. Barkey, Rochester, N.Y.

[73] Assignee: Eastman Kodak Company, Rochester, N.Y.

[21] Appl. No.: 764,942

[22] Filed: Feb. 2, 1977

Related U.S. Application Data

[63] Continuation-in-part of Ser. No. 656,508, Feb. 9, 1976, abandoned.

[51] Int. Cl.² ................................................. G03C 1/68
[52] U.S. Cl. ........................................ 96/67; 96/35.1; 96/86 P; 96/115 R; 252/400 A; 252/404; 260/45.7 P; 528/286; 528/295; 528/301; 528/304; 528/305
[58] Field of Search .................... 96/115, 35.1, 86 P; 252/400 A, 404, 407; 260/45.7 P, 75 P

[56] References Cited

U.S. PATENT DOCUMENTS

| | | | |
|---|---|---|---|
| 3,115,465 | 1/1963 | Orloff et al. | 252/400 A |
| 3,361,846 | 1/1968 | Steimm et al. | 260/75 P |
| 3,376,258 | 4/1968 | Gysling et al. | 260/75 P |
| 3,402,142 | 9/1968 | Follett | 260/45 P |
| 3,422,030 | 1/1969 | Riley, Jr. | 252/400 A |
| 3,445,504 | 5/1969 | Mehalso | 260/75 P |
| 3,489,722 | 1/1970 | Kotaui | 260/75 P |
| 3,556,999 | 1/1971 | Messina | 252/400 A |
| 3,692,867 | 9/1972 | Mayer et al. | 260/45 P |
| 3,812,220 | 5/1974 | Robin | 252/400 A |

*Primary Examiner*—John D. Welsh
*Attorney, Agent, or Firm*—B. D. Wiese

[57] ABSTRACT

A process is disclosed for inhibiting in a polymerization reaction crosslinking of photocrosslinkable condensation homopolymers and copolymers by use of a synergistic inhibitor composition comprising specified amounts of a hindered phenolic compound and a phosphoric acid ester in the presence of monomers from which said homopolymers and copolymers are formed. Residue from the inhibitor composition remains in the polymeric product and serves as a stabilizer against heat deterioration and premature crosslinking of the product during recovery and storage. The stabilized homopolymers and copolymers are useful for manufacture of radiation sensitive elements. Photographic elements formed from the stabilized condensation polymers are particularly useful as lithographic plates.

18 Claims, No Drawings

PROCESS FOR MAKING STABILIZED POLYESTERS USED IN RADIATION-SENSITIVE COMPOSITIONS FOR LITHOGRAPHIC PLATES HAVING IMPROVED WEAR LIFE INCLUDING HINDERED PHENOLS AND PHOSPHORIC ACID ESTERS

This application is a continuation-in-part of application Ser. No. 656,508, filed Feb. 9, 1976, now abandoned.

BACKGROUND OF THE INVENTION

Field of the Invention

The present invention is directed to a process for inhibiting in a polymerization reaction crosslinking and branch-chain formation in a photocrosslinkable condensation polymer, while providing a stabilized polymer which is stable during high temperature recovery steps and thereafter in storage and is compatible with the other components of a radiation-sensitive element in which the stabilized polymer is present as a radiation-sensitive polymer.

In another aspect, this invention is directed to a radiation-sensitive element capable of being developed with an aqueous alcoholic alkaline developer. In yet another aspect, this invention is directed to a radiation-sensitive composition containing a stabilized crosslinkable condensation polymer having solubilizing repeating units. This invention is also directed to certain stabilized crosslinkable copolymers containing substituents capable of rendering the copolymers in their noncrosslinked form soluble in polar solvents.

Description of Problem

Crosslinkable homopolymers and copolymers are useful for the preparation of radiation-sensitive photoresist compositions, which in turn, are useful for the manufacture of radiation-sensitive elements, such as relief and lithographic printing plates. In such compositions and elements, the characteristics of such a polymer have an important effect upon the quality of the image produced on the plate and on the life of the plate itself in a printing press.

Radiation-sensitive compositions in which crosslinkable polymers may be used are generally categorized in the photographic arts as being either positive-working or negative-working. Positive-working compositions are used to form radiation-sensitive coatings which can be selectively solubilized in irradiated areas, thus leaving behind a positive of the exposure image. In a common form, positive-working compositions can be coated and developed using aqueous solvents. For example, development is usually achieved by swabbing the radiation-sensitive coating after exposure with an aqueous alkaline developer solution. On the other hand, negative-working compositions are used to form radiation-sensitive coatings which can be selectively solubilized in unexposed areas, leaving behind a negative of the exposure image.

Negative-working compositions can be formed from crosslinkable polymers which crosslink in irradiated areas and become insoluble in the irradiated areas. A coating of such a composition is ordinarily formed using an organic solvent as the coating medium. After the coating has been exposed to radiation, a developer is used in removing the unexposed portions of the coating to form a negative image. Organic developers usually are used with negative-working radiation-sensitive coatings. These developers are expensive as compared with aqueous alkaline solutions employed with positive-working coatings. Also, organic developers are substantially more burdensome to dispose after use than are aqueous alkaline solutions, since, if untreated, they can be ecologically objectionable.

The characteristics of photocrosslinkable condensation polymers used in the above compositions are largely determined by the chemical reactions which monomers from which the polymers are being made undergo during the polymerization process. Two principal types of chemical reaction must be controlled in the process. The first is condensation polymerization; the second is crosslinking and branching, or branch-chain formation during polymerization. Condensation copolymerization is the desired reaction and results in a polymeric product having a desired degree of a measurable physical property, such as, its average molecular weight, molecular weight distribution, or inherent viscosity. Branching and crosslinking of units of the molecular chains of the polymeric product, however, are undesirable side reactions. These side reactions during polymerization cause the polymeric product to have present unacceptable amounts of low and high molecular weight polymer and to have a wide molecular weight distribution. Consequently, gelation and even complete insolubilization may occur to make the polymeric product inferior and often unacceptable for its intended use as a photocrosslinkable condensation polymer in a radiation-sensitive composition or element.

Crosslinking and branching during polymerization of highly reactive monomers can be caused by many factors, such as high reaction temperatures, presence of chemical impurities in the monomers, types of catalysts used, uncontrolled polymerization conditions, such as, air leakage into the reactor during or after the polymerization reaction, residues from prior polymerization reactions, polymer recovery procedures, high temperature distillation under vacuum, storage conditions and length of time of storage, and the like. Prevention or inhibition of the adverse effects of these factors is especially necessary and desirable when the polymer is one which is highly susceptible to crosslinking, as is the crosslinkable condensation polymer with which the present invention is concerned.

In summary, the problem to which the invention is directed is the prevention of the occurrence of undesirable crosslinking and branching which occurs during the process of polymerizing monomers used to make radiation-crosslinkable condensation polymers of sufficiently high quality to make them suitable for manufacture of either positive-working or negative-working radiation-sensitive compositions and of radiation-sensitive elements, e.g., lithographic plates, made with such compositions.

SUMMARY OF THE INVENTION

This invention comprises a process wherein an effective amount of a synergistic mixture of crosslinking inhibitor compounds comprising at least one hindered phenolic compound and at least one phosphoric acid ester compound is used to prevent, or at least to inhibit, unwanted crosslinking and branching in a photocrosslinkable condensation polymer during its preparation by polymerization of at least one polyhydric alcohol and at least one dicarboxylic acid containing at least one non-aromatic, ethylenic-bond-containing group.

The synergistic mixture comprises a phosphoric acid ester compound providing a phosphate group having the formula

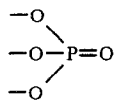

and a hindered phenolic compound providing at least one phenolic hydroxy (—OH) group in a ratio. The phosphoric acid ester and the hindered phenolic compound are used in a molar ratio which provides the phosphate and phenolic hydroxy groups in a numerical ratio of from about 1:1 to 1:6, respectively. Optimum results are obtained when the compounds are used in a molar ratio which provides the groups in a numerical ratio of about 1:2 (phosphate:phenolic hydroxy), and in a total amount which provides advantages without interferring with the catalyst(s) used in the polyesterification process, or with radiation-sensitive compositions prepared from stabilized polymers made by the process, or with radiation-sensitive elements, particularly lithographic plates, made using such radiation-sensitive compositions containing the stabilized polymers.

The synergistic mixture of inhibitor compounds (also referred to herein as the synergistic inhibitor composition) is used in an amount sufficient to maintain measurable physical properties of the polymer within limits of parameters for each property as established from tests made on photocrosslinkable condensation polymers, especially polymers used in radiation-sensitive compositions used to make lithographic plates having improved wear lives. Physical properties which have been found to be significant are inherent viscosity (I.V.) of the polymer, its number average (N.A.) molecular weight, its weight average (W.A.) molecular weight and its polydispersity ratio, as described herein. In accordance with the invention, the hindered phenolic compound and the phosphate ester compound are present in the synergistic inhibitor composition in a ratio which provides both a higher weight average molecular weight and a lower polydispersity ratio of the polymer than can be obtained by use of either inhibitor compound alone.

The above advantages are obtained by introducing the synergistic inhibitor composition into a reaction vessel with the ingredients and catalyst(s) used to make a polyester. The composition, or a residue thereof, is present during all stages of the melt ester exchange, prepolymer, and polymer formation reactions. For example, residue of the composition remains in the polymer and is present when polymer melt condensation reaction is prematurely stopped at an intermediate molecular weight, prior to subsequent recovery of the prepolymer. Such residue is then also present during conversion of the prepolymer to a polyester polymer, e.g., in a solid phase polymerization step.

Residues of the synergistic inhibitor composition, or of a modified composition comprising the inhibitor compounds of the composition, remain in the polymer and serve to stabilize the polymer during high temperature recovery steps and in storage prior to its use.

In one form, stabilized polymer of this invention is an improved homopolymer of an otherwise known class of polymers. It has dicarboxylic acid derived repeating units containing at least one non-aromatic, ethylenic-bond-containing group capable of providing crosslinking sites and having the formula

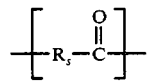

in which $R_s$ represents an unsubstituted or substituted aliphatic or cycloaliphatic hydrocarbon group of 2 to 7 carbon atoms which comprise at least one ethylenic bond, capable of crosslinking. In a preferred embodiment, the stabilized polymer is an improved copolymer of said otherwise known class of polymers which contain said

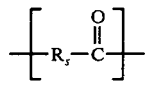

repeating units and which also contain aromatic dicarboxylic acid derived repeating units containing disulfonimino units containing monovalent cations as imino nitrogen atom substituents, having the formula:

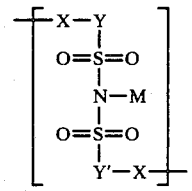

wherein
X is a carbonyl group;
Y is an aromatic group;
Y' is an aromatic group or an alkyl group including from 1 through 12 carbon atoms; and
M is a solubilizing cation.

The invention also relates to radiation-sensitive elements, particularly photographic elements, formed with a stabilized crosslinkable condensation polymer or copolymer made by the process of this invention. Particularly, the invention relates to lithographic plates formed with a radiation-sensitive composition with dicarboxylic acid units containing at least one non-aromatic, ethylenic-bond-containing group, and preferably both types of the above dicarboxylic acid units, which is stabilized against premature crosslinking by the presence of the polymerization residue of the synergistic mixture of crosslinking inhibitor compounds of this invention.

DESCRIPTION OF THE PRIOR ART

The phenomena of branching and crosslinking reactions are well-known and are described in textbooks, such as, for example, in R. W. Lenz, *Organic Chemistry of Synthetic High Polymers*, Interscience Publishers (1967) New York, New York, pages 73–75 and 97. Crosslinking and branching in diene polymers are discussed also in P. J. Flory, *Principles of Polymer Chemistry*, Cornell University Press (1953), Ithaca, N.Y., pages 260–261. However, within the context of this invention the term "branch-chain formation" refers to condensation polymer chains that are crosslinked to such a slight degree that they remain soluble in the solvents used for inherent viscosity and molecular weight determination. The term "crosslinking" refers to condensation polymer chains that are crosslinked to such a degree that they no longer dissolve in these solvents. The potential for crosslinking in polymerization reactions involving polyfunctional monomers which act as branching or crosslinking sites in a growing polymer chain is very high, and can attain explosive rapidity, as described by Lenz at page 73. Accordingly, the need for crosslinking and branching inhibitors in such polymerization reactions is of continuing interest in the polymerization art, particularly in manufacture of polyesters.

It is known that heating in the presence of air or of oxygen-containing solutions or atmospheres tends chemically to degrade linear polyester materials used in the production of self-supporting film, such as film used for photographic or other radiation sensitive processes.

The degrading effect of heat on polyesters has been discussed by H. A. Pohl in the *Journal of the American Chemical Society* 73, 5660–5661 (1951), and by I. Marshall and A. Todd in *Transactions of the Faraday Society* 49, 67–78 (1953). For example, when polyesters are heated at elevated temperatures, they degrade in physical properties and in molecular weight.

In U.S. Pat. No. 3,227,680, Tamblyn et al show that a heat-stabilizing material (e.g., a hydroquinone compound containing one or two ester-forming groups in addition to the two phenolic hydroxy groups) can be chemically combined with polyester-forming materials to form a new composition which is a polyester with a chemically built-in heat stabilizer in the polyester chain. Such a new composition has improved heat stability as measured by evaluating the molecular weight breakdown sustained by the polyester on heating, determined by means of inherent viscosity measurements.

Dexter et al, U.S. Pat. No. 3,285,855 issued Nov. 15, 1966, describe stabilization of an organic material including polyesters, with compounds which are esters of hindered hydroxybenzoic and hydroxyphenylalkanoic acids, e.g., tetra-[methylene 3-(3,5-di-t-butyl-4-hydroxyphenyl) propionate]methane.

Barkey, U.S. Pat. No. 3,404,121 issued Oct. 1, 1968 describes a process for manufacturing a stabilized superpolyester of at least one dicarboxylic acid and at least one bifunctional glycol in the presence of titanium and zinc compounds as catalysts and a phosphorus-containing material selected from phosphoric acid, phosphorus acid, alkyl phosphates, e.g., tri(2-ethylhexyl)phosphate, alkyl phosphites, aryl phosphates, aryl phosphites, alkaryl phosphates, alkaryl phosphites, aralkyl phosphates, or aralkyl phosphites, and mixtures thereof.

Engle and Ackland, U.S. Pat. No. 3,028,366 issued Apr. 3, 1962, describe a catalytic process for the preparation of substantially colorless polymeric glycol terephthalates wherein a phosphoric compound selected from phosphoric acid alkyl phosphates, e.g., tri(ethylhexyl phosphate), hydroxyalkyl phosphate, or an aryl phosphate is used during the polymerization step.

Barkey, U.K. Pat. No. 1,107,657K, complete specification published 27 Mar. 1968, describes stabilizing polyester film support, after the synthetic resin used in the support has been manufactured and prior to its use in an extrusion die, by incorporating therein an organic phosphorus compound, e.g., tri(2-ethylhexyl) phosphate, in an amount sufficient to minimize the acetaldehyde content of the extruded film.

Incorporation of both a phenolic compound and a phosphorus compound into a polyester or into the polyester-forming reactants to improve stability of the resulting resin and to improve its color is taught in a number of U.S. and foreign patents. Gleim, Canadian Pat. No. 763,491 and corresponding U.K. Pat. No. 1,107,832, teaches incorporating a hindered phenolic antioxidant compound and an organophosphorus stabilizer compound into the reactants for making the polyester. These patents teach that the combination of a phosphorus stabilizer plus an antioxidant compound result in greater stabilization against molecular weight decrease than either the phosphorus compound, e.g., diphenylbenzene phosphonate, or the hindered phenolic compound used as an antioxidant. Triphenyl phosphate and tricresyl phosphate are described as other useful organic phosphorus compounds which may be used in practicing Gleim's invention.

Photocrosslinkable condensation copolymers and photothermographic processes and elements with which this invention is directly concerned are described in copending Arcesi and Rauner, U.S. application Ser. No. 397,179 filed Sept. 14, 1973, now U.S. Pat. No. 3,929,489, issued Dec. 30, 1975, and in Allen, U.S. Pat. No. 3,622,320 issued Nov. 23, 1971. Pertinent parts of that application and patent will be described more fully in the description of the present invention herein. Light sensitive compounds in the form of soluble polycondensation products predominantly linked through ester bonds and having

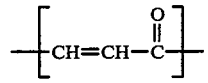

groups bonded to aromatic nuclei, along with a reproduction method in which such compounds are used, are described in Schellenberg and Bayer, U.S. Pat. No. 3,020,208, issued Apr. 17, 1962. Lithographic printing plates are described in Rauner and Deerhake, U.S. Pat. No. 3,511,661 issued May 12, 1970. Disulfonamide compounds are described in Caldwell and Jones, U.S. Pat. No. 3,546,180 issued Dec. 8, 1970.

A method for directly developing a relief image in a polymerizable composition is described in Dickie et al, U.S. Pat. No. 3,732,097. Mench et al, U.S. Pat. No. 3,615,628 issued Oct. 26, 1971 describes the use of sensitized polyesters containing unsaturated alicyclic rings coated upon a support material to provide negative-working photographic elements useful in the photomechanical arts for preparing lithographic and relief printing plates and resist stencils for etching and other operations. Akamatsu et al, U.S. Pat. No. 3,628,963 describes photosensitive compositions comprising an unsaturated polyester, acrylic acid and a photopolymerization initiator. Steppan et al, U.S. Pat. No. 3,635,720 issued Jan. 18, 1972 describe manufacture of a light-sensitive layer of polymers capable of being cross-linked under the action of light. Philipot et al, U.S. Pat. No. 3,726,685 issued Apr. 10, 1973 and Kurka, U.S. Pat. No. 3,825,430 issued July 23, 1974 describe light-sensitive copolyesters which are photocrosslinkable and useful in manufacturing of lithographic plates.

Yamagishi, U.S. Pat. No. 3,636,086 issued Jan. 18, 1972 describes use of condensed phosphoric acid salts such as alkali pyrophosphates, tripolyphosphates, tetrametaphosphates and hexametaphosphates and silicic acid salts in combination with a polymerization inhibitor to prevent polymerization of unsaturated carboxylic acid esters in aqueous solutions.

BRIEF DESCRIPTION AND PREFERRED EMBODIMENTS

This invention relates to preparation of stabilized crosslinkable condensation polymers which are particularly useful in the manufacture of lithographic plates having improved wear life, color proofing systems, or similar reproduction means that depend on a coating of an unsaturated resin on a film element which can be exposed to radiation to induce crosslinking, and thereby insolubilization, of the exposed area of the coating while leaving the remainder of the coating with its original properties.

The stabilized crosslinkable condensation polymers must be readily crosslinkable and usable for their intended purposes, but must not crosslink prematurely. Further, the polymers must not be contaminated with materials which will promote crosslinking at an undesired time or which will affect the photosensitivity or thermal sensitivity of the polymers. Also, the polymers must be free of contaminants, such as gel particles or catalyst or inhibitor residues, which would interfere with the solubility and clarity of the polymers in casting dopes, and cause surface defects in the film cast from the dopes, and cosmetic defects in prints reproduced from lithographic plates bearing such films.

The procedure for manufacture of crosslinkable condensation polymers is well-known and is described in the prior art patents referred to above, particularly in Allen, U.S. Pat. No. 3,622,320. Additional procedures are described in U.S. Pat. No. 3,929,489 of Arcesi and Rauner, which features are incorporated herein by reference. The methods of manufacture of such polymers and handling of the polymers during their recovery, storage and solubilizing in preparation of dopes, and subsequent casting and drying of the dopes on plates, for example, as described in Allen's patent, provide many opportunities for premature crosslinking of the copolymers to occur prior to an intended time of use.

It is known in the prior art to use an inhibitor in a monomer to prevent premature polymerization of the monomer, for example, during storage. The inhibitor then is removed or destroyed before or during the polymerization of the monomer to obtain a good yield of polymer. It is known also to use a compound which is an antioxidant to counteract the effect of oxygen coming into contact with the polymer from the atmosphere or from chemical reactions in the reactor or in a recovery still. Also, it is known to use a compound which is referred to as a stabilizer to protect the polymer against the adverse effects of light, heat and/or humidity. The present invention is an improvement over the known processes and relates to the use of an advantageous combination of certain of such known compounds for the inhibition of crosslinking and branching in crosslinkable condensation polymers to obtain a high weight average molecular weight and a polydispersity in the range between about 1.8 and less than 3.4 and preferably between about 1.8 and about 2.5 in the polymers for at least one new beneficial purpose, the increasing of wear life in lithographic plates made with the polymers, as described herein.

Definition of Polydispersity

The term "polydispersity" as used herein is an indication of molecular weight distribution. It may be defined as a ratio calculated from data determined from gel permeation chromatographic analysis of a polymer. The method of analysis is well known and is described, for example, in the article by Bannister et al, *Analytical Chemistry*, Vol. 26, No. 9, September 1954, pages 1451–1454, (Amer. Chem. Soc., Washington, D. C.) entitled "Adsorption Chromatography and Liquid Partition of High Polymers." Briefly, a solution of the polymer is passed through a tower packed with a molecular sieve type of adsorption material. Molecules of polymer are fractionated by being absorbed into the openings of the material in a distribution depending on the sizes of the molecules. Smallest molecules are absorbed first; largest are absorbed last, or not at all. The number of molecules in each gradient of the column is measured and a number average (N.A.) is calculated. The molecular weights of the molecules in each gradient are measured by known methods, e.g., viscosity measurements and a weight average (W.A.) is calculated. Polystyrene is used as a standard for comparison of its number average and weight average molecular weights with those obtained with the polymer being fractionated. The values for the polymer are then recorded as "number average polystyrene equivalent molecular weight", or N.A. (PSEW) and as "weight average polystyrene equivalent molecular weight" W.A. (PSEW). The "polydispersity" is the ratio of the weight average, W.A. (PSEW), to the number average, N.A. (PSEW), or W.A. (PSEW), to the number average, N.A. (PSEW), or $$W.A. (PSEW)/N.A. (PSEW) = polydispersity.$$

For example, a polymer having N.A. (PSEW) of 7100 and a W.A. (PSEW) of 17,900 has a polydispersity of 2.5.

In the discussion and description of the invention which follows the designation (PSEW) will not repeatedly be used, but it is to be understood that the values for the number and weight molecular weight averages are given in terms of PSEW values.

As is apparent, a polymer having a high weight average molecular weight and a low number average of different sized molecules will have a high polydispersity. Conversely, a polymer having the same high weight average molecular weight but a higher number average would have a lower polydispersity. It has been found that a polymer having optimum properties for use as a crosslinkable condensation copolymer in a radiation sensitive element for lithographic plate manufacture is obtained when the polymer is polymerized under conditions providing a polymer having a N.A. (PSEW) of from about 7,000 to 20,000 and W.A. (PSEW) of from about 13,000 to 40,000 and a polydispersity from about 1.8 to about 3.4 and preferably from about 1.8 to about 2.5. The process of this invention provides such conditions.

Significance of Polydispersity

The present invention is directed toward providing stabilized polymer with a high weight average molecular weight and a polydispersity in a range between about 1.8 and less than 3.4, and preferably between about 1.8 and about 2.5. These results are obtained by preventing occurrence of premature branching and crosslinking of crosslinkable condensation polymer, particularly in the polymerization vessel. It is essential to prevent such crosslinking so as not to interfere with the radiation-sensitive properties of the resulting stabilized polymer in its subsequent intended use, and thus not to affect adversely the image formed in a coating layer containing the polymer as a radiation sensitive material.

Polyesterification reactions which are involved in preparing the crosslinkable condensation polymers with which this invention is concerned necessarily are conducted at elevated temperatures which exceed 200° C in order to insure practical rates of polymerization for commercial needs. Such high temperature conditions are commonly used in manufacture of unsaturated aromatic and aromatic-aliphatic polyesters. At such high temperatures the presence of even small amounts of impurities can cause cross-linking to occur.

Crosslinking and branching are manifested by the formation of gel particles in the polymer and are indicative of the presence of high molecular weight crosslinked and branched polymer chains.

In working with crosslinkable condensation polymers for the preparation of radiation-sensitive elements, it has been found that the effectiveness of such polymers as radiation crosslinkable materials is adversely influenced not only by the presence of gel particles, but also by a wide spread in the distribution range of the molecular weights of polymer molecules. Unsatisfactory polymer has been found to be indicated by a high polydispersity and/or an excessively high weight average molecular weight. It has also been found that many adverse effects can be eliminated or minimized by preventing or inhibiting the premature crosslinking of the polymer.

Prior to the present invention only one type of compound, a phosphate ester of a hindered phenolic compound, was found to be useful as an inhibitor compound for the manufacture in larger than laboratory batches of acceptable batches of polyesters comprising di-ethyl-p-benzenediacrylate (DEBA) a monomer providing repeating units

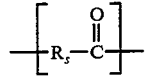

that is used to prepare photocrosslinkable condensation polymers of the type described herein. The phosphate ester was of the type described in U.K. Pat. No. 1,165,748 and is exemplified by tris(3,5-di-t-butyl-4-hydroxy-phenyl)phosphate. When the polymer was made in large batches stabilized with a phosphoric acid ester, e.g., TOF, the polymer was unsatisfactory because of the high flocculation level attained with a particular skeleton of carbon atoms forming the backbone of the polymer.

The synergistic mixture of hindered phenolic and phosphoric acid ester compounds of the present invention provides a satisfactory crosslinking and branching inhibiting composition for use in manufacture of crosslinkable condensation homopolymers and copolymers from DEBA in production-sized vessels in commercial quantities.

Materials Involved in Practice of Invention

The photocrosslinkable condensation polymers and their precursor monomers with which this invention is concerned and the hindered phenols and phosphoric acid esters used in the practice of the invention will now be more fully described.

A. Photocrosslinkable Condensation Polymers Having Repeating Diacid-Derived Units of Type (I)

1. Compounds Providing Repeating Units (I)

In one aspect, the photocrosslinkable condensation polymer involved in practice of this invention is a soluble condensation homopolymer, referred to hereafter as polymer (I), having dicarboxylic acid derived repeating units of type (I) containing non-aromatic ethylenic unsaturation capable of providing crosslinking sites for the purpose of insolubilizing the polymer upon exposure of the composition to actinic radiation. The repeating units (I) have the following formula:

where $R_s$ represents an unsubstituted or substituted aliphatic or cycloaliphatic hydrocarbon group of 2 to 7 carbon atoms which comprises at least one ethylenic bond.

In one preferred form the repeating units (I) are light-sensitive units of the type disclosed by Schellenberg and Bayer in U.S. Pat. No. 3,030,208 issued Apr. 17, 1962. These repeating units contain at least two condensation sites at least one of which is derived from compounds providing a group of the formula

bonded directly to an aromatic nucleus. R' can be, for instance, an hydroxyl group where the compound is a free acid, an oxy atom linkage where the compound is an acid anhydride, a halogen atom where the compound is in the form of an acid halide or an alkoxy radical where the compound is in the form of an ester.

The repeating units (I) containing the group (A) are preferably formed from cinnamic acid and its derivatives. Such compounds can be generically defined by the formula

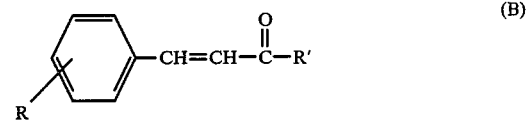

wherein
R' is as previously defined and R represents one or more acrylic, carboxyl or amino groups, and is chosen to provide at least one condensation site. To increase the concentration of light-sensitive groups (A), in a specific preferred form R is chosen to provide at least one additional group of the formula (A). A preferred compound for forming the repeating units (I) is p-phenylene diacrylic acid or a derivative thereof, especially di-ethyl-p-benzenediacrylate (DEBA). Other useful compounds are disclosed by Schellenberg and Bayer, cited above. Still other compounds which can be used to form the repeating units (I) are disclosed in Laakso, U.S. Pat. No 3,702,765, issued Nov. 14, 1972, Allen U.S. Pat. No. 3,622,320. The compounds and other disclosures of each of these patents are here incorporated by reference.

In another preferred form the repeating units (I) can be formed from dicarboxylic acids having the formula

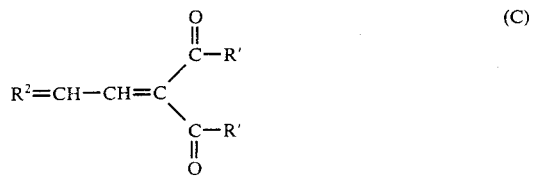 (C)

wherein $R^2$ represents an alkylidene, aralkylidene or heterocyclic group, or a derivative thereof and R' is as previously defined. Examples of diacids that correspond to the general formula (C) and that are particularly useful in the practice of the present invention include cinnamylidenemalonic acid, 2-butenylidenemalonic acid, 3-pentenylidenemalonic acid, o-nitrocinnamylidenemalonic acid naphthylallylidenemalonic acid, 2-furfurylideneethylidenemalonic acid, N-methylpyridylidene-2-ethylidenemalonic acid, N-methylquinolidene-2-ethylidenemalonic acid, N-methylbenzothiazolylidene-2-ethylidenemalonic acid, and the like, as well as functional derivatives of these acids. Such acids are fully disclosed by Philipot et al, U.S. Pat. No. 3,674,745, issued July 4, 1972, the disclosure of which is here incorporated by reference, particularly as to the acids described therein.

In still another preferred form the repeating units (I) can be formed from muconic acid or a functional derivative thereof having the formula

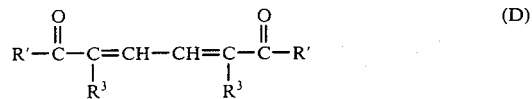 (D)

where R' is as previously defined and $R^3$ is a hydrogen atom or a methyl group. Exemplary muconic acids are trans, trans-muconic acid; cis, trans-muconic acid; cis, cis-muconic acid; $\alpha,\alpha'$-cis, trans-dimethylmuconic acid, and $\alpha,\alpha'$-cis, cis-dimethylmuconic acid. These and other muconic acid compounds useful in forming repeating units (I) in the practice of this invention are more fully disclosed in McConkey U.S. Pat. No. 3,615,434 issued Oct. 26, 1971, the disclosure of which is here incorporated by reference, particularly as to the acids described therein.

In an additional preferred form, the repeating units (I) can be formed from unsaturated carbocyclic dicarboxylic acids or their derivatives. Such compounds can be represented by the structural formula

 (E)

wherein R' is as previously defined and Z represents the atoms necessary to form an unsaturated, bridged or unbridged cycloaliphatic nucleus typically having 6 to 7 carbon atoms. Such a cycloaliphatic nucleus can be substituted or unsubstituted. Particularly suitable acid units are 4-cyclohexene-1,2-dicarboxylic acid, 5-norbornene-2,3-dicarboxylic acid, hexachloro-5[2:2:1]bicycloheptene-2,3-dicarboxylic acid and the like. Such acids are fully disclosed in Canadian Pat. No. 824,096, issued Sept. 30, 1969, the disclosure of which is here incorporated by reference particularly as to the acids described therein.

The repeating units (I) containing the groups E can also be formed of cyclohexadiene dicarboxylic acid and its derivatives. Such compounds can be generically represented by the formula

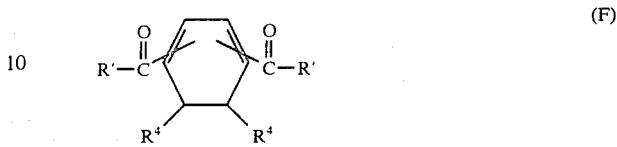 (F)

wherein each $R^4$ is a hydrogen atom, an alkyl group of 1 to 12 carbon atoms of branched or straight chain or cyclic configuration (e.g. methyl, ethyl, propyl, isopropyl, butyl, t-butyl, amyl neopentyl, cyclohexyl, etc.) or an aryl group including mono- or poly-nuclear aryl groups such as phenyl, naphthyl, etc. The alkyl and aryl groups can be substituted with such substituents as do not interfere with the condensation reaction, such as halo, nitro, aryl, alkoxy, aryloxy and the like; R' is as previously defined and the carbonyl groups are attached to the cyclohexadiene nucleus meta or para to each other and preferably para. Particularly suited cyclohexadiene dicarboxylic acid units include 1,3-cyclohexadiene-1,4-dicarboxylic acid; 1,3-cyclohexadiene-1,3-dicarboxylic acid; 1,3-cyclohexadiene-1,2-dicarboxylic acid; 1,5-cyclohexadiene-1,4-dicarboxylic acid; 1,5-cyclohexadiene-1,3-dicarboxylic acid and alkylated and arylated derivatives of such dicarboxylic acids. Such acids as well as the functional derivatives thereof are fully disclosed in Belgian Pat. No. 754,892, issued Oct. 15, 1970, the disclosure of which is here incorporated by reference, particularly as to the acids described therein.

2. Difunctional Compounds Provided for Condensation with Compounds Providing Repeating Units (I)

Repeating units (I) formed from at least one compound of formulas A through F can be linked into a photocrosslinkable condensation homopolymer (I) by reaction with at least one difunctional compound providing repeating units (L) capable of condensing with a carboxylic acid or a functional derivative thereof to complete the acid units of the condensation polymer.

In a preferred form, repeating units (L) will have the formula $+O—R^5—O+$ and can be formed using one or more diols of the formula (G) 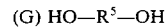

wherein $R^5$ is a divalent organic radical generally having from about 2 to 12 carbon atoms and including hydrogen and carbon atoms and, optionally, ether oxygen atoms. Exemplary preferred $R^5$ radicals include hydrocarbon radicals, such as straight and branched chain alkylene radicals (e.g., ethylene, trimethylene, neopentylene, etc.), cycloalkylene radicals (e.g., cyclohexylene), cycloalkylenebisalkylene radicals (e.g., 1,4-cyclohexylenedimethylene), and arylene radicals (e.g., phenylene) and hydrocarbon-oxy-hydrocarbon radicals, such as alkylene-oxy-alkylene, alkylene-oxy-cycloalkylene-oxyalkylene, and the like. Exemplary diols that can be utilized in preparing the condensation copolymers of this invention include ethylene glycol, diethylene glycol, 1,3-propanediol; 1,4-butanediol; 1,5- pentanediol; 1,6-hexanediol; 1,7-heptanediol; 1,8-octanediol; 1,9-nonanediol; 1,10-decanediol; 1,12-dodecanediol; neopentyl glycol; 1,4-cyclohexane dimethanol; 1,4-bis(β-hydroxy ethoxy)-cyclohexane and the like. The corresponding diamines can, if desired, be substituted for the diols in forming condensation polymers according to this invention. One or a mixture of diols and/or diamines can be used in forming the condensation polymers.

As is well known, the formation of the polymer (I) by condensation inherently determines that the repeating units (L) will approximately equal on a molar basis the sum of the number of repeating units (I) present. As a practical matter, it is frequently desirable to utilize an excess of up to about 100 molar percent of the reactant forming the repeating units (L).

When a glycol of formula (G) is used which has an extremely high boiling point and a low vapor pressure at polyester polymerization reaction temperatures, it is advisable to utilize lower molar excesses, usually of from 5 to 40 percent and preferably of 10 to 20 percent.

3. Catalysts Used

The catalysts which may be used in the preparation of photocrosslinkable condensation polyesters, such as described above, include organic and inorganic compounds of metals, such as titanium, antimony, zinc, lead, calcium, lithium, combinations thereof, etc., heretofore utilized by those skilled in the art. The prior art, for example, discloses a great number of such catalysts, some of which are described in patents such as U.S. Pat. Nos. 2,465,319; 2,720,502; 2,727,881 and others. Specific catalysts heretofore known and which are utilized include titanium tetrabutoxide, tetraisopropol titanate, titanium dioxide, zinc acetate, zinc acetyl, acetonate, germanium dioxide or alkylate, lead oxide, calcium oxide, lithium ethoxide, antimony trioxide, manganese oxides, manganese acetate and the like. Tetraisopropyltitanate is preferably used.

The amount of catalyst(s) used is based on the total weights of the reactants and catalyst(s) used. The concentration of catalyst(s), as metal, can range from about 50 to about 500 parts per million parts (ppm) by weight, e.g., pounds, of the combined weight of dicarboxylic acid and diol polymerization components. Usually, the amounts will range from 100 to about 200 ppm, as metal. Preferably, it will range from about 50 to about 150 ppm of titanium, introduced in the form of tetraisopropyltitanate catalyst.

4. Synergistic Inhibitor Composition

Stabilized photocrosslinkable condensation polymer of this invention is prepared by reacting at least one compound of formula A through F with at least one compound of formula G in the presence of at least one of the catalysts described above, essentially in the presence of a synergistic composition comprising at least one hindered phenol and at least one phosphate ester.

a. Hindered phenolics Used In Synergistic Inhibitor Composition

Hindered phenolic antioxidants are described in Dexter et al, U.S. Pat. No. 3,285,855 and O'Neill, U.S. Pat. No. 3,442,806. Such compounds are known to stabilize organic materials against oxidative degradation and deterioration caused by thermal effects and visible and/or ultraviolet radiation. As used in the present invention, only certain hindered phenols are used in combination with only certain phosphoric acid esters to provide a synergistic mixture of materials which inhibits undesired crosslinking and branching of photocrosslinkable condensation polymers of this invention during and after their polymerization from monomers used in their manufacture and yet leaves a residue which protects and stabilizes the polymer without interfering with its crosslinking by a source of radiation.

A hindered phenolic compound useful for the practice of the invention must have certain characteristics which permits its use as an effective inhibitor in the polymerization process while leaving a residue which serves as a stabilizer for the subsequent recovery of the polymer from the polymerization reaction mass. One characteristic that the hindered phenolic compound must have is that the compound be substantially non-boiling under temperature and pressure conditions used in the formation of the condensation polymer. Accordingly, the compound must be thermally stable to a temperature of about 250° C and preferably up to about 300° C and be substantially non-volatile from the reaction mass during at least the early part of the condensation reaction. Since most compounds have sufficient vapor pressure to be removed during the vacuum phase of the polymerization, a high boiling point is not sufficient to insure retention of the compound in the vessel. In order to meet the latter requirement, another characteristic that the compound must have is that it have a reactive group capable of reacting with functional groups of monomers and/or the polymer product. The reactive group can be any group useful for modifying a polyester by entering into the polycondensation reaction. The reactive group can be derived from an alcohol, an ester, or an amine. Preferably the reactive group is a hydroxyalkyl group derived from an alcohol, e.g., hydroxymethyl group derived from methanol, or ester groups such as lower alkyl carboxylates.

In furtherance of this requirement, another characteristic of the hindered phenolic compound is that the reactive group must be in para position relative to a phenolic hydroxy group to better insure its reaction totally or partly, and retentivity in the polyester.

Yet another characteristic of the hindered phenolic compound is that it have present sufficient phenolic hydroxy groups to provide a molar ratio of at least one phenolic —OH group for each phosphate group

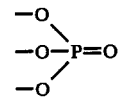

derived from a phosphoric acid ester of a substituted alcohol of the class described below and used in the synergistic mixture. Synergism is optimum for phosphate and hindered phenolic groups used in a 1:2 ratio.

The above described characteristics are provided by a hindered phenolic compound represented by the formula:

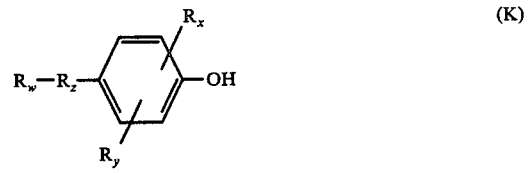

wherein $R_w$ is a functional group capable of interchanging with the polyester, $R_x$ and $R_y$ are alpha-branched alkyl radicals containing 3-20 carbon atoms, alpha-branched aralkyl radicals containing 7-20 carbon atoms, or cycloalkyl radicals containing 6-20 carbon atoms and $R_z$ is a divalent hydrocarbon radical containing from 1 to 3 carbon atoms. $R_w$ preferably is $R_sO$—,

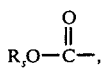

where $R_s$ is H— or a radical selected from those defined for $R_x$ and $R_y$.

Examples of hindered phenolic compounds of formula (K) are n-octadecyl-3-(3,5-di-t-butyl-4-hydroxyphenyl)propionate (Irganox 1076), 5,5'-bis(5-t-butyl-2,3-dimethyl-4-hydroxybenzyl) dithioterephthalate (Antioxidant 1729), 4-hydroxymethyl-2,6-di-t-butyl phenol (Antioxidant 754), and 2,6-di-t-butyl-α-dimethylamino-p-cresol (Antioxidant 703). Irganox 1076 is a trademark of Geigy Chemical Corporation. Antioxidant 703 and Antioxidant 754 are trademarks of Ethyl Corporation. Antioxidant 1729 is a trademark of American Cyanamid Corporation.

Particularly useful hindered phenolics are those derived from pentaerythritol and represented by the formula:

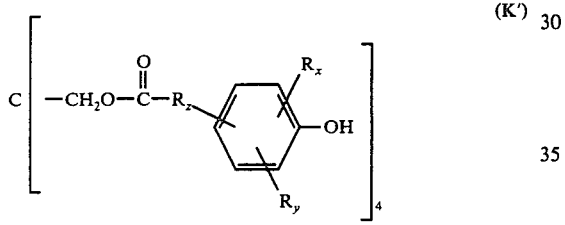

wherein $R_x$, $R_y$ and $R_z$ are the same as defined in (K).

Examples of hindered phenol compounds having formula (K') include:
tetrakis-[methylene 3-(3,5-di-tert-butyl-4-hydroxyphenyl propionate]methane, and
tetrakis-[methylene 3-(3-tert-butyl-5-methyl-4-hydroxyphenyl)propionate]methane.

Tetrakis-[methylene 3-(3,5-di-tert-butyl)-4-hydroxyphenyl) propionate]methane is especially preferred for use in the invention. A commercial form of the compound is sold by Geigy Chemical Corporation under the trademark Irganox 1010. Other similar phenolic compounds without groups capable of participating in the polycondensation reaction were not found effective.

b. Phosphoric Acid Esters Used in Synergistic Inhibitor Composition

Phosphorus compounds are well known for their use in the manufacture of polyesters by esterification or ester exchange and condensation. Engle et al U.S. Pat. No. 3,028,366, Barkey U.S. Pat. No. 3,404,121, and Kibler et al U.S. Pat. No. 3,546,177 teach such use. Barkey U.S. Pat. No. 3,404,121, cited above, for example, teaches that stability against color formation, aldehyde formation and other deleterious contaminants can be obtained by introducing a phosphorus-containing compound in minor amount into a monomer and in a major amount during the polymer condensation step for making a polyester. Gleim et al U.S. Pat. No. 3,361,846 describes still another class of phosphorus compounds, hindered phenolic phosphite or hindered phenolic phosphate esters used to stabilize polyester against development of color when polyester is aged in air at elevated temperatures. Gleim teaches to add the stabilizer after the polycondensation reaction is substantially completed. However, none of the above teachings of the prior art is directed to the problem to which the present invention is directed. In fact, it has been found that only certain organic phosphorus compounds of those described above can be utilized as crosslinking and branching inhibitors for practicing the present invention to obtain the advantages and benefits thereof.

As with the hindered phenolic compounds used in the synergistic inhibitor mixture hereof, the organic phosphorus compound used to practice the invention must be thermally stable and nonvolatile at a temperature of 250°–300° C during the condensation reaction. To aid in meeting this requirement, the compound must be capable of ester interchanging with the polymer. To minimize acidic and thermal decomposition reactions of the phosphate inhibitor, trialkyl phosphate esters are preferred phosphoric acid esters for ester interchanging with other ester groups in the polyester reaction. Preferably, the ester moiety group of the phosphoric acid ester contains an alkoxy group derived from an alcohol, e.g., 2-ethyl-hexyloxy group derived from the corresponding 2-ethylhexanol. The organic phosphorus compound attaches itself to the polymer molecules by ester interchange type reaction, thereby preventing the inhibitor from being volatilized from the polymerizer. Interaction also occurs between the phosphorus compound and the hindered phenolic compound. While the inventor hereof does not intend to be bound by any theory for the cause of the synergistic effect of his combined use of a hindered phenolic compound and phosphoric acid ester during the polyesterification process, he believes that the reaction between the inhibitor compounds in situ with each other and with the monomers and polymer in some manner provides better inhibiting action, and, subsequently, crosslinking and branching inhibiting effects than does either compound when used alone. The effect is greatest when the phosphate and hindered phenolic groups are present in the polymeric resin in a 1:2 molar ratio.

Another characteristic of the organic phosphorus compound used in practicing this invention is that it does not have any reactive hydrogen groups which could cause the compound to deactivate the catalyst used in the condensation reaction. For this reason mono and dialkyl phosphate esters are not generally acceptable for use, being excluded because they are impractical in the manufacture of aromatic type polyesters by condensation polymerization.

Compounds having the desired characteristics are the fully esterified phosphoric acid esters, particularly trialkyl, phenyl and alkylphenyl esters of phosphoric acid having high boiling points. Such useful phosphoric acid esters have the formula

wherein $R_1$, $R_2$ and $R_3$ are each a hydrocarbon radical having from 6 to 8 carbon atoms. Accordingly, $R_1$, $R_2$ and $R_3$ each can be an octyl, 2-ethylhexyl, 2,2,4-trimethylpentyl, phenyl, 2-tolyl, 3-tolyl, 4-tolyl, 2,5-dimethylphenyl, 2,6-dimethylphenyl, 3,4-dimethylphenyl, or 3,5-dimethylphenyl radical.

Examples of particularly useful phosphoric acid esters are trioctyl phosphate, tri(2-ethylhexyl)phosphate, 2- and 4-tritolylphosphate (also known as o- and p-tricresylphosphates), 2,2,4-(trimethylpentyl) phosphate, tris(2,5-dimethylpentyl)phosphate, and triphenylphosphate. With titanium catalysts and where color of product is important, it is preferred to avoid using aromatic phosphate esters.

B. Photocrosslinkable Condensation Copolymers Having Both Type (I) and Type (II) Repeating Units In another aspect, the photocrosslinkable condensation polymer involved in practice of this invention is a soluble condensation copolymer, referred to hereafter as copolymer (II) having both type (I) and second dicarboxylic acid derived reacting units of type (II). Copolymers formed by reacting multiple glycols with single or multiple acid or ester compounds are included within the scope of this invention.

1. Compounds Providing Repeating Units (I)

The first dicarboxylic acid derived repeating units are of the same type (I) as are used to make the homopolymer (I). They are formed as described earlier from a compound of a formula A through F and contain nonaromatic ethylenic unsaturation capable of providing radiation-crosslinkable sites for the purpose of insolubilizing the copolymer or a composition containing it upon exposure to actinic radiation.

2. Compounds Providing Repeating Units (II)

The second dicarboxcylic acid derived repeating units are aromatic dicarboxylic acid repeating units referred to hereafter as type (II) and contain disulfonimino units containing monovalent cations as imino nitrogen atom substituents, thus rendering the polymer in its unexposed form soluble in an aqueous alcoholic alkaline developer.

Repeating units of the type (II) have the following formula:

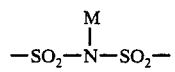
(II)

wherein
X is a carbonyl group;
n and m are integers whose sum equals 1;
Q is defined by the formula

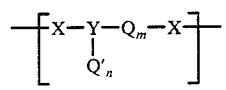

Q' is defined by the formula

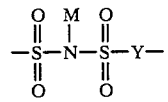

Y is an aromatic group;
Y' is an aromatic group or an alkyl group having from 1 through 12 carbon atoms; and
M is a solubilizing cation and preferably a monovalent cation such as an alkali metal or ammonium cation.

Copolymers (II) containing repeating units (II), provided for the purpose of rendering the film-forming copolymer soluble in aqueous alkaline solutions before it is exposed to actinic radiation for crosslinking, can be formed from aromatic dicarboxylic acids or their derivatives including a disulfonimino group, i.e., a $$-SO_2-\underset{M}{N}-SO_2-$$

group, in which the imino nitrogen atom includes as an additional substituent a solubilizing cation. These aromatic dicarboxylic acids are preferably those characterized by the formula:

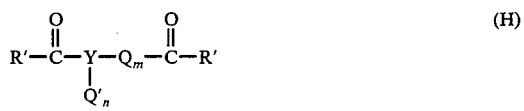
(H)

wherein
R' is as previously defined;
m and n are integers whose sum equals 1;
Q is defined by the formula

(H-1)

Q' is defined by the formula

(H-2)

Y is an aromatic group, such as an arylene group (e.g. phenylene, naphthylene, etc.) or arylidyne group (e.g. phenenyl, $C_6H_3$; naphthylidyne, $C_{10}H_5$; etc.);
Y' is an alkyl or aromatic group, such as an aryl, alkaryl or aralkyl group, in which each of the alkyl moieties includes from 1 through 12 carbon atoms and, preferably, from 1 through 6 carbon atoms; and
M is a solubilizing cation and preferably a monovalent cation such as an alkali metal or ammonium cation.

Compounds preferred for use in forming repeating units (II) are: 3,3'-[(sodio-imino)disulfonyl]dibenzoic acid; 3,3'-[(potassium-imimo)disulfonyl]dibenzoic acid; 3,3'-](lithium-imino)disulfonyl]dibenzoic acid; 4,4'-[(lithium-imino)disulfonyl]-dibenzoic acid; 4,4'-[(sodio-imino)disulfonyl]dibenzoic acid; 4,4'-[(potassium-imino)disulfonyl]dibenzoic acid; 3,4'-[(lithium-imino)-disulfonyl]dibenzoic acid; 3,4'-[(sodio-imino)disulfonyl]dibenzoic acid; 5-[4-chloronaphth-1-ylsyulfonyl-(sodio-imino)-sulfonyl]isophthalic acid; 4,4'-[(potassium-imino)-disulfonyl]dinaphthoic acid; 5-[p-tolylsulfonyl]-(potassium-imino)-sulfonyl]isophthalic acid; 4-[p-tolyl-sulfonyl-(sodio-imino)-sulfonyl]-1,5-naphthalenedicarboxylic acid; 5-[n-hexylsulfonyl-(lithium-imino)-sulfonyl]isophthalic acid; 2-[phenylsulfonyl-(potassium-imino)-sulfonyl]terephthalic acid and functional derivatives thereof. These and other dicarboxylic acids useful in forming repeating units (II) of the condensation copolymers of this invention are disclosed in Caldwell and Jones U.S. Pat. No. 3,546,180, issued Dec. 8, 1970, the disclosure of which is here incorporated by reference, particularly as to the acids described therein.

In a preferred form the stabilized condensation copolymers (II) of this invention incorporate from 98 to 55 mole percent repeating units (I) and from 2 to 45 mole percent repeating units (II), these mole percentages being based on the total acid units present. In a specific preferred form the repeating units (I) account for from 97 to 85 mole percent while the repeating units (II) account for 2 to 12 mole percent of the copolymer, based on the total acid units present.

3. Difunctional Compounds Provided for Condensation with Compounds Providing Repeating Units (I) and (II)

In addition to the dicarboxylic acid repeating units (I) and (II) intended to promote crosslinking and solubilization, respectively, of the copolymer, the copolymer also incorporates repeating units (L). The units (L) are of the same kind as are used to make the homopolymer (I). They are formed as described earlier from a compound of formula (G).

4. Compounds Optionally Providing Repeating Units (III)

In addition to the repeating units (I) and (II) intended to promote crosslinking and solubilization, respectively, and linking repeating units (L), the condensation polymers of this invention can incorporate repeating units (III) to complete the acid units of the condensation polymer. In a preferred form these repeating units can be formed from dicarboxylic acids or their derivatives defined by the formula

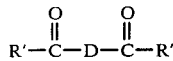
(J)

wherein R' is as previously defined, and D is a divalent hydrocarbon radical. D is preferably an arylene or alkylene radical. The repeating units (III) preferably take the form of one or more carboxylic acids or functional derivatives thereof having from 3 to 20 carbon atoms. Preferred aromatic dicarboxylic acids useful in forming the repeating units (III) are phthalic acids, such as phthalic acid, isophthalic acid and terephthalic acid. Exemplary aliphatic dicarboxylic acids include malonic, succinic, glutaric, adipic, pimelic, suberic, azelaic, sebacic and other higher homolog dicarboxylic acids. Since these repeating units (III) serve neither to solubilize nor crosslink the condensation polymer, they are, of course, optionally used. They can comprise up to 43 mole percent of the polymer, based on the total acid units present. Preferably the repeating units (III) comprise no more than 25 mole percent of polymer (I) or (II), based on total acid units percent.

As is well known, the formation of the copolymer by condensation inherently determines that some of the repeating units (L) will approximately equal on a molar basis the sum of the number of repeating units (I), (II), and (III) present. As a practical matter, it is frequently desirable to utilize an excess of up to about 100 molar percent of the diol reactant (G) forming the repeating units (L).

5. Catalysts

The catalysts used in the preparation of stabilized photocrosslinkable condensation copolymer (II) having repeating units (I), (II), (L), and, optionally, (III) are the same as those described above. The amounts used also will be about the same as described above.

6. Synergistic Inhibitor Composition

The synergistic inhibitor composition described above also is used in the preparation of stabilized copolymer (II).

Formulations of Materials

1. Formulation of Synergistic Inhibitor Composition

The synergistic inhibitor composition comprises a mixture of at least one phosphoric acid ester represented by the formula (P), above, and at least one hindered phenolic compound represented by the formula (K), above, which will provide

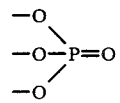

and phenolic hydroxy groups in the ratio range of from about 1:1 to 1:6, respectively.

Optimum results are obtained when the phosphoric acid ester and hindered phenolic compound are used in a molar ratio which provides the above groups in the synergistic inhibitor composition in a numerical ratio of about 1:2 (phosphate:phenolic hydroxy). This numerical ratio has been found optimum in that the rate of polymerization is not significantly decreased while crosslinking and branching of the polymer are minimized. Decreasing the ratio to below about 1:1 results in a significant decrease in synergism and a trend toward more acidity of the reaction mass. Likewise, increasing the ratio to above about 1:6 results in a significant decrease in synergism and a trend toward increase in acidity. Additionally, use of excessive amounts of either or both inhibitor compounds in the reaction mass, which can arise through use of excessive amounts of the synergistic inhibitor composition, will promote acidity in the reaction mass. Acidity promotes and accelerates degradation of the phosphoric acid ester, forming phosphorus compounds which deactivate the catalyst(s) in the reaction mass. This in turn results in a significant and growing decrease in the polymerization rate and thus defeats a purpose of the invention, which is to achieve a rapid polymerization rate in a plant-sized reaction vessel with a minimum amount of crosslinking and branching of the polymer.

Preferably, the hindered phenolic compound will provide two phenolic hydroxy groups to one phorphorus-containing group of the phosphate ester. For example, and preferably, the compound providing the

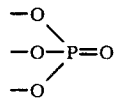

group will be tri(2-ethylhexyl) phosphate and the compound providing the two —OH groups will be tetrakis-[methylene  3-(3,5-di-tertbutyl-4-hydroxyphenyl)propionate]methane. Also, the compounds preferably will be present in the mixture in a molar ratio of 1:2 phosphate to phenol. Any other phosphates and hindered phenolics which satisfy all of the previously stated requirements can be substituted, respectively, for these preferred compounds.

The quantities of synergistic inhibitor composition used in preparing homopolymer (I) and copolymer (II) are described in the following formulations.

2. Formulation of Reactants to Prepare Stabilized Homopolymer (I)

In carrying out the preparation of stabilized homopolymer (I) in accordance with the present invention, the reactants, inhibitors and catalyst preferably are mixed and reacted in the following proportions. One mole of a diacid represented by formulas A through F and providing at least one unit (I) is mixed with (i) at least a stoichiometric amount of at least one diol represented by formula (G) and providing at least one unit (L) in the presence of (ii) from about 0.0005 to about 0.005 moles of the combined amount of the synergistic inhibitor composition described above and comprising at least one phosphoric acid ester represented by formula (P) and at least one hindered phenolic compound represented by formula (K) in a molar ratio providing

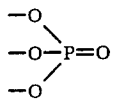

and phenolic hydroxy groups in the ratio of from 1:1 to 1:6, and reacted in the presence of (iii) from about 50 to about 500 ppm of condensation catalyst as described above, per million parts of reactants.

Preferably, the initial ratio of diol (G) providing repeating unit (L) to the diacid used will be from about 1.05 to about 1.15 (mol ratio). Preferably, the amount of synergistic inhibitor composition will be from about .0001 mole to about .002 mole of phosphoric acid ester with synergistic molar amounts of hindered phenol per mole of polyester product to be formed. Preferably, the amount of catalyst, as metal will be from about 50 to about 500 parts by weight, e.g., in pounds, of combined weight of diacid and diol polymerization components.

Preferably, repeating unit (I) is derived from a diacid compound defined by the formula:

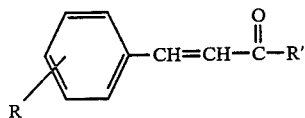

as described above.

Preferably, repeating unit (L) is derived from a diol which is an alkylene-oxy-cycloalkylene-oxy-alkylene.

Preferably, the hindered phenolic compound is a compound described by the formula:

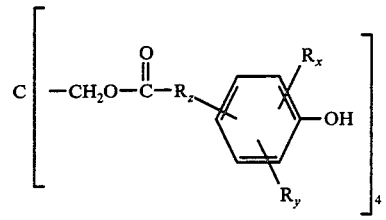

as described above.

Preferably, the phosphoric acid ester is a compound defined by the formula:

as described above.

Preferably, the catalyst is an organic titanium compound as described above.

Preferably, the catalyst is an organic titanium compound as described above.

In a preferred embodiment, one mole of di-ethyl-p-benzenediacrylate (DEBA) and 1.05 to 1.25 moles of di-β-hydroxyethoxycyclohexane (HEC) are reacted in the presence of 0.1 to 0.5 mole of tri(ethylene)phosphate and 0.005 to 0.0025 mole of tetrakis-[methylene-3-(3,5-di-tert-butyl-4-hydroxy-phenyl) propionate]methane and 50 to 150 ppm of titanium as tetraisopropyltitanate to prepare the stabilized photocrosslinkable homopolymer (I) (di-ethyl-p-benzenediacrylate:1,4-di-β-hydroxyetoxycyclohexane 50:50) having repeating photocrosslinkable units (I) of the formula:

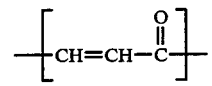

3. Formulation of Reactants to Prepare Stabilized Copolymer (II)

The procedure for preparation of stabilized copolymer (II) is similar to that used for preparation of stabilized homopolymer (I). According to the invention, the reactants are mixed and reacted in about the following proportions. One mole of a compound represented by formulas A through F and providing at least one repeating unit (I) is mixed with (i) from 0.02 to about 0.12 mole, and preferably between 0.0002 and 0.12 mole, of at lease one compound represented by formula (H) and providing at least one repeating unit (II), (ii) at least a stoichiometric amount of at least one compound represented by the formula (G) and providing at least one repeating unit (L), (iii) from about 0.0005 to about 0.005 mole of a synergistic inhibitor composition described above and comprising at least one phosphoric acid ester represented by formula (P), and at least one hindered phenolic compound represented by formula (K) in a molar ratio providing

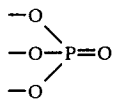

and phenolic hydroxy groups in the ratio of from about 1:1 to about 1:6, and reacted in the presence of (iv) from about 50 to about 500 ppm of a condensation catalyst as described above.

Preferably, the amount of compound (H) providing repeating unit (II) will be from about 0.03 to 0.15 moles. Preferably, the glycol ratio of compound (G) providing unit (L) to the other reactants will be from about 1.05 to about 1.15 (molar ratio). Preferably, the amount of synergistic inhibitor composition will include from about 10 to about 200 ppm of phosphorus based on polyester, in a ratio of 1:2 of phosphate ester group to hindered phenolic groups.

Preferably, repeating unit (I) is derived from a compound defined by the formula

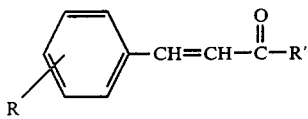 (B)

as described above.

Preferably, repeating unit (II) is derived from a compound defined by the formula

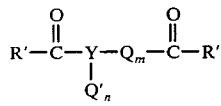 (H)

as described and named above.

Preferably, repeating unit (L) is derived from a diol of formula (J) HO — R⁵ — OH which is an alkylene-oxy-cycoalkylene-oxy-alkylene as described above.

Preferably, the hindered phenolic compound will be a compound defined by the formula

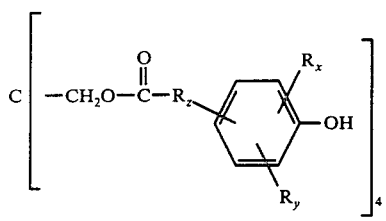 (K')

as described above.

Preferably, the phosphoric acid ester will be a compound defined by the formula

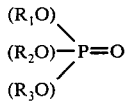 (P)

as described above.

In a preferred embodiment, di-ethyl-p-benzenediacrylate (DEBA) (100 mol percent), 1,4-di-β-hydroxyethoxycyclohexane (HEC) (100–125 mol percent), and dimethyl-3,3'-[(sodio-imino)disulfonyl]dibenzoic acid (3–15 mol percent) are reacted in the presence of 1.0–5.0 moles of phosphorus as tri(2-ethyl-hexyl)phosphate (TOF), 0.5–2.5 moles of tetrakis-[methylene 3-(3,5-di-tert-butyl-4-hydroxyphenyl[propionate]methane, and 50 to 150 ppm of titanium as tetraisopropyltitanate to prepare the stabilized copolymer (di-ethyl-p-benzenediacrylate:1,4-di-β-hydroxyethoxycyclohexane:-dimethyl-3,3'[(sodio-imino)disulfonyl]dibenzoic acid, 100:97–85:3–15) having repeating photocrosslinkable repeating units (I) of the formula

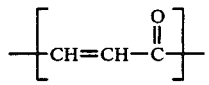

and repeating solubilizing repeating units (II) of the formula

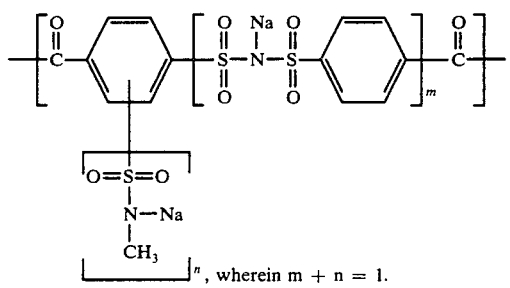, wherein m + n = 1.

Polymer Preparation Conditions

Preparation of the stabilized condensation homopolymers (I) and copolymers (II) of this invention can be carried out using the same procedures generally known to those skilled in the art for preparing the unstabilized forms of these polymers. Such procedures are described, for example, in the patents cited above, particularly in Allen, U.S. Pat. No. 3,622,320, Barkey, U.S. Pat. No. 3,404,121, and U.S. Pat. No. 3,929,489 of Arcesi and Rauner, the procedures of which are incorporated herein by reference.

Typically, the condensation polymers are formed by reacting the diacid and diol reactants and the hindered phenolic and phosphoric acid ester in a polymerizer vessel in the presence of a catalyst, such as tetrabutyltitanate, tetraisopropyltitanate, antimony oxide, strontium oxide, zinc acetate, and the like. In general since phosphate esters and reactive groups on hindered phenolics react more slowly than do primary reactants, it is preferred to add them at the beginning of the ester exchange reaction. If they are added later, it is customary to allow time for their ester interchange reactions with the polyester to occur. The vessel contents are preferably purged of air before adding the catalyst and the inhibitor composition comprising the hindered phenolic compound and the phosphoric acid ester. The temperature is then raised gradually to about 210° C (410° F). Ester exchange reaction takes place with distillation of byproducts, e.g., alcohol, beginning at about 150° C (302° F). Preferably, vacuum is used to remove volatile byproducts toward the end of the ester exchange reaction, prior to the condensation step. Preferably, the ester exchange reaction is completed by the time the vacuum in the polymerizer vessel is under 25 inches of Hg. Preferably, mole ratios of reactants, amounts and ratios of catalysts and synergistic inhibitor composition, reaction temperatures, vacuum conditions and temperatures of distillation columns are all controlled to achieve a rapid ester exchange reaction which does not exceed about a five hour period, in order to minimize crosslinking and branching. During recovery of unreacted monomers, e.g., 1,4-di-β-hydroxyethoxycyclohexane, it is preferred to maintain distillation column temperatures at 200° C (392° F) or above. Temperatures in the polymerizer during the condensation step preferably are maintained below about 250° C (437° F) and most preferably at a temperature below about 235° C (455° F). Glycol should be removed efficiently. If it is not, undesirable branching and crosslinking occur as temperature and duration of heating will increase the degree of polymerization achieved, as evidenced by inherent viscosity measurements, for example. Typically, it is desirable that the stabilized crosslinkable condensation polymers with minimum branching of this invention exhibit an inherent viscosity of from 0.2 to 1.0 ± 0.02 and, most preferably, from 0.3 to 0.55 ± .02. Unless otherwise stated, all inherent viscosities are to be understood to have been measured in 6:4 phenol:chlorobenzene (volume ratio) at 25° C using 0.25 grams of polymer per deciliter of solution.

Recovery of Stabilized Polymer Product

During the condensation reaction, progress of the reaction preferably is monitored by the torque imposed on the agitator of the reaction vessel, which may be measured in milliamperes (ma). The torque readings for a particular polymer are correlated to the range of inherent viscosities of the polymer during its formation in the vessel. Torque readings will vary with the molecular weight of the polymer and characteristics of the reaction vessel. When the torque reading reaches a predetermined maximum, as shown, for example, in the following Examples, the condensation reaction may be considered substantially to be completed for a particular degree of polymerization. A sample of polymer may then be taken and its inherent viscosity determined to confirm the degree of polymerization. The polymerizer contents are then brought to atmospheric pressure by introducing nitrogen. The molten polymer is drained from the polymerizers into receiving containers, such as cooling trays, and allowed to cool and solidify. The solidified polymer than may be broken up and ground to a desired size for further handling, storage, dissolution, and compounding purposes. It is also feasible to stop the reaction by adding solvent directly to the reactor to cool and dissolve the contents.

General Characteristics of Preferred Polymeric Products

1. Stabilized Photocrosslinkable Condensation Homopolymer (I-S) Having Repeating Diacid-Derived Units of Type (I)

Homopolymer (I) made in accordance with the present invention is a stabilized photocrosslinkable condensation homopolymer containing repeating diacid-derived units (I) and diol-derived repeating units (L). Repeating units (I) can be selectively crosslinked by means of radiation to an insoluble resin form.

In order to distinguish the stabilized homopolymer (I) of this invention from its prior art non-stabilized form, i.e., homopolymer (I), the stabilized homopolymer will hereafter be referred to as homopolymer (I-S), or polymer (I-S). Homopolymer (I-S) contains detectable amounts of residue of the synergistic inhibitor composition of hindered phenol and phosphoric acid ester compounds used in the polymerization reaction to prevent premature crosslinking and branching of the polymer. The residue consists of trace amounts of the inhibitor compounds both in their original forms and in the forms of compounds made by interactions of these compounds with each other and with the reactive units (I) and (L) of the diacids and diols, respectively, used to form the polymer. The presence of the residue in the polymer serves to stabilize the polymer against deterioration by the high temperature conditions necessarily used to distill off byproducts and unreacted monomers during the last stages of the polymerization reaction in the polymerizer vessel. The amount of the residue usually is sufficient to make it unnecessary to add additional stabilizer to the polymer to prevent premature crosslinking of the polymer before its intended time for crosslinking, unless the polymer is to be subjected to high storage temperatures. Also, the amount of the residue in the polymer is insufficient to interfere with the photocrosslinking of the polymer in its use in a radiation-sensitive element.

In a most preferred embodiment, a species of homopolymer (I-S) prepared by reacting di-ethyl-p-benzenediacrylate (100 mol percent) with 1,4-di-β-hydroxyethoxycyclohexane (120 mol percent) with 140 ppm titanium as tetraisopropyltitanate in the presence of an inhibitor composition comprising 84 ppm of phosphorus as tri(2-ethylhexyl) phosphate and 1568 ppm of tetrakis [methylene 3-(3,5-di-tert-butyl-4-hydroxyphenyl)propionate] methane (2.67 mols TOF:1.33 moles Irganox 1010 per million grams of polymer) will form the stabilized photocrosslinkable homopolymer (I-S), di-ethyl-p-benzenediacrylate:1,4-di-β-hydroxyethoxycyclohexane, 50:50), having an inherent viscosity of about 0.35± 0.005 and having a weight average (W.A.) molecular weight, (PSEW) of from about 14,000 to 20,000, with a corresponding polydispersity of from abut 1.8 to 2.5. Preferably, this species of homopolymer (I-S) has an inherent viscosity of about 0.35 and W.A. of about 17,000. Deviations from the above values for inherent viscosity, W.A. and polydispersity are indicative of occurrence of undesired premature crosslinking and branching in the homopolymer which makes it inferior for use in manufacture of radiation-sensitive elements, such as lithographic plates having long wear life.

2. Stabilized Photocrosslinkable Condensation Copolymer (II-S) Having Repeating Diacid-Derived Units of Type (I) and Type (II)

An important crosslinkable condensation copolymer made in the practice of this invention is a stabilized film-forming condensatio copolymer, hereafter referred to as copolymer (II-S) or polymer (II-S), which is soluble in aqueous developers and which can be selectively crosslinked to an insoluble form. This condensation copolymer (II-S) is comprised of first repeating diacid derived units (I) provided for the purpose of introducing crosslinking sites, second repeating diacid-derived units (II) containing solubilizing substituents and diol-derived repeating units (L), and contains residual amounts of hindered phenolic and phosphoric acid ester compounds in their original forms and/or in metathesized forms in combination with the copolymer. The combination of crosslinking inhibitor compounds consisting of hindered phenolic and such organic phosphate compounds has been found to provide low polydispersity in the copolymer (II-S). The residue of the combination of these same compounds and their reaction products formed in the polymerizer vessel also serves to stabilize the copolymer during the high temperature condensation stages, and in subsequent handling and storage after it has been recovered, as discussed above with reference to homopolymer (I-S).

In one aspect, a species of copolymer (II-S) prepared by reacting di-ethyl-p-benzenediacrylate (0.93 mole), dimethyl 3,3-[(sodio-imino)disulfonyl]dibenzoate (0.07 mole), 1,4-di-$\beta$-hydroxyethoxycyclohexane (1.10 mole), 0.00133 mole of phosphorus as tri(2-ethylhexyl)phosphate, 0.00067 mole of tetrakis[methylene 3-(3,5-di-tert-butyl-4-hydroxyphenyl)propionate]methane and 140 ppm of titanium as tetraisopropyltitanate will form the copolymer (II-S) (di-ethyl-p-benzenediacrylate: 1,4-di-$\beta$-hydroxyethoxycyclohexane:dimethyl-3,3'-[(sodioimino)disulfonyl]dibenzoic acid, 0.93:1.00:0.07) having an inherent viscosity of about 0.45 $\pm$ 0.05 and having a weight average molecular weight, W.A., of from about 11,500 to 14,500. Preferably, this species of copolymer (II-S) has an inherent viscosity of 0.45 and W.A. 13,000.

The presence of the ionic imino group in the modifying dibasic acid of formula H in the copolymer (II-S) appears to increase the difficulty to obtain a polycondensation polymer essentially free from crosslinked polymer chains. One reason for this increased difficulty is that — under otherwise identical reaction conditions — the time required for obtaining a copolymer of a comparable degree of polymerization is substantially longer than the time required for obtaining the corresponding homopolymer.

Due to this longer reaction time, it is difficult completely to avoid the formation of at least some crosslinking during polymerization. An important advantage of the synergistically acting inhibitor pair of the present invention is that is provides a means for obtaining a commercially useful photosensitive copolymer even under such adverse conditions.

However, the gel permeation chromatography (GPC) analysis of such copolymers is only of limited value. The molecular weight analysis will, in all likelihood, not account for the total presence of crosslinked polymer chains. For this reason, particularly, the obtained weight average molecular weight values and the polydispersity values will be lower than they actually should be. In addition, the presence of bulky crosslinked polymer chains will tend to artificially increase the inherent viscosity measurements, to the extent that such crosslinked polymer chains remain soluble in the highly polar solvent used for the inherent viscosity determination of the polyester of the invention.

For this reason, and because of the ionic nature of the modifying dicarboxylic acid component, the results of the GPC analysis of the copolymer obtained using a less polar solvent, tetrahydrofuran, cannot be directly compared with those for the homopolymer. The GPC analysis provides, however, a useful indication, at the desired I.V. level between 0.45 and 0.50, that the polycondensation polymerization has proceeded to about the same degree of polymerization as that of the corresponding homopolymer.

Synergistic Activity of Hindered Phenolic and Phosphoric Acid

The synergistic activity of the use of a mixture of a hindered phenolic with a phosphoric acid ester can be shown by comparison of the polydispersities and/or the weight average molecular weights obtained for crosslinkable polymers as made in the following Examples.

EXAMPLE 1

Polymer (I) Prepared in Absence of Inhibitor

A laboratory sized stainless steel ester exchange reactor, including a fractionation column, condenser and distillate receiver, was used to prepare polymers from di-ethyl-p-benzene diacrylate (DEBA) and 1,4-di-$\beta$-hydroxyethoxycyclohexane (HEC). The reactor was charged with 274 g. (1 mole) of DEBA, 245 g. (1.2 mols) HEC, and 10 g. of an ethanol solution containing 0.32 g. of tetraisopropyl titanate, corresponding to 140 ppm of titanium, based on the molecular weight of 386 for di-ethyl-p-benzene diacrylate: 1,4-di-$\beta$-hydroxyethoxycyclohexane, 50:50 polymer having recurring light-sensitive type (I) units of the formula

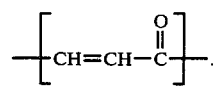

The torque reading at the beginning of the ester exchange reaction, which lasted 15 minutes, was 150(ma). Ethanol by-product was distilled from the reaction mass beginning at a reaction temperature of about 150° C. To carry out the condensation reaction, the temperature of the reaction mass was raised to 210° C.; 108 ml. of condensate were recovered. The reactor contents were then subjected to vacuum (3mm Hg pressure), and the temperature in the reactor was raised to 227°–230° C to complete the melt polymerization, i.e., condensation, of the polymer. At 120 minutes the inherent viscosity (determined by dissolving 0.25 g. of polymer in 100 ml of 60:40 phenol: chlorobenzene solvent at 25° C) was 0.58. At the end of 135 minutes, the polymer was insoluble even at 80° C in the same solvent system. The high degree of insolubility was an indication of a high degree of crosslinking in the polymer. The resin from the reactor was cooled and dissolved into 772 g. of ethylene chloride. Some of the resin failed to dissolve. This polymer (I) without any stabilizer was unsatisfactory for use as a suitable radiation sensitive crosslinkable polymer for making lithographic plates.

EXAMPLE 2

Polymer (I) Prepared in Presence of Tri(2-ethylhexyl)phosphate (TOF) (0.6125 g., .00053 mole, TOF)

Using the apparatus described in Example 1, 274 g (1 mole) of di-ethyl-p-benzenediacrylate, 245 g. (1.2 mole) of 1,4-di-$\beta$-hydroxyethoxycyclohexane, 10 g of ethanol solution containing 0.32 g. of tetraisopropyltitanate, and 0.6125 g. (.00053 mole) of tri(2-ethylhexyl)phosphate (TOF) were reacted in the manner described in Example 1. The ester exchange step of the reaction was completed in about 25 minutes during which time the temperature in the reactor rose from 180° to 207° C., and 106 ml. of condensate were recovered. The torque readings at various times and temperatures during the condensation step of the reaction were as follows:

| Total Reaction Time, Min. | Reaction Temp., ° C | Pressure, mm Hg. | Torque, ma |
|---|---|---|---|
| 0–25 | (ester exchange) | | |
| 26 | (begin condensation) | | |

-continued

| Total Reaction Time, Min. | Reaction Temp., °C | Pressure, mm Hg. | Torque, ma |
| --- | --- | --- | --- |
| 57 | 226 | 3 | 145 |
| 68 | 227 | 3.2 | 148 |
| 88 | 227 | 3.0 | 150 |
| 137 | 227 | 2.8 | 155 |
| 174 | 227 | 3.0 | 160 |
| 195 | 227 | 3.0 | 165 |

When the melt viscosity of the polymer in the reactor and corresponding agitator torque reading of 165 ma was reached, the reaction was stopped by pressurizing the reactor with nitrogen to atmospheric pressure. The inherent viscosity of a sample withdrawn at the end of the reaction, determined as described in Example 1, was found to be 0.27. The carboxyl group content of the polymeric resin product was determined in a known way and found to be: —COOH=6meq/kg. (milliequivalents of —COOH per kilogram of resin).

A sample of the resin was subjected to gel permeation chromatographic analysis. The N.A. (PSEW) molecular weight was determined to be 6800. The W.A. (PSEW) molecular weight was determined to be 23,300. The polydispersity ratio was then calculated from these values and found to be 3.4. This polymer (I) resin product made with TOF as stabilizer was found to be unsatisfactory for its intended use as a radiation sensitive crosslinkable polymer because of an unacceptable amount of crosslinking and the resultant presence of insoluble high molecular weight polymer.

EXAMPLE 3

Polymer (I) Prepared in Presence of Tetrakis [methylene-3-(3,5-di-tert-butyl-4-hydroxyphenyl)propionate] methane (Irganox 1010); (1.656 g., .00014 mole, Irganox 1010)

The apparatus described in Example 1 was used to react 274 g (1 mole) of di-ethyl-p-benzenediacrylate, 245 g (1.2 mole) of 1,4-di-β-hydroxyethoxycyclohexane, 10 g of ethanol containing 0.32 g of tetraisopropyltitanate, and 1.656 g (.00014 mole) of Irganox 1010 in the manner described in Examples 1 and 2. The ester exchange reaction was completed in about 40 minutes, during which time the temperature in the reactor rose from 180 to 227° C., 106 ml of condensate (ethanol) were recovered. The torque readings at various times and temperatures during the condensation step of the reaction were as follows:

| Total Time of Reaction, Min. | Reaction Temp., °C | Pressure, mm Hg | Torque, ma |
| --- | --- | --- | --- |
| 0–40 | 180–227 | (ester exchange) | |
| 41 | 227 | start | |
| 60 | 230 | 3.0 | 140 |
| 78 | 230 | 3.2 | 145 |
| 121 | 230 | 3.0 | 150 |
| 152 | 230 | 3.4 | 155 |
| 182 | 230 | 3.2 | 160 |
| 235 | 230 | 3.0 | 165 |

Inherent viscosity of the product was found to be 0.32. A sample of the polymer (I) resin was subjected to gel permeation chromatographic (GPC) analysis and the following values were obtained:
N.A. (PSEW) = 6800 (mol. wt.)
W.A. (PSEW) = 23,800 (mol. wt.)
Polydispersity = 3.5
The polymer (I) made in the presence of Irganox 1010 was found unsatisfactory for its intended use as a radiation sensitivity crosslinkable polymer because of an unacceptable degree of crosslinking and the resultant presence of insoluble high molecular weight polymer.

EXAMPLE 3a

The preparation of homopolymer (I) was repeated under identical conditions as were used in Example 3, with the exception that the amount of Irganox 1010 which was used was doubled.

A homopolymer product of similar inherent viscosity as that obtained in Example 3 was obtained. However, contrary to a hoped for improvement by the use of increased amount of inhibitor no smaller value of polydispersity was obtained than in Example 3.

It is, therefore, apparent that, under the reaction conditions used, a significant increase in the amount of hindered phenolic compound used during polymerization does not lead to a homopolymer of the desired polydispersity required for a photosensitive layer of the lithographic printing plate of this invention.

EXAMPLE 4

Polymer (I) Prepared in Presence of Tri(2-ethylhexyl)phosphate (TOF); (1.000 g., .0023 mole, TOF)

The apparatus described in Example 1 was used to react 274 g. (1 mole) of di-ethyl-p-benzenediacrylate, 245 g (1.2 mole) of 1,4-di-β-hydroxylethoxycyclohexane, 10 g of ethanol containing 0.32 g of tetraisopropyltitanate, and 1,000 g (.0023 mole) of TOF in the manner described in the preceding examples. The ester exchange reaction was completed in about 24 minutes, during which time the temperature in the reactor rose from 180° to 225° C. 106 ml of condensate were recovered. The torque readings during the condensation step were as follows:

| Total Time of Reaction, Min. | Reaction Temp., °C | Pressure, mm Hg | Torque, ma |
| --- | --- | --- | --- |
| 0–24 | 180–225 | (ester exhange) | |
| 25 | 225 | start | |
| 40 | 230 | 3.0 | 150 |
| 62 | 230 | 3.0 | 150 |
| 92 | 230 | 2.9 | 155 |
| 126 | 230 | 2.9 | 160 |
| 150 | 230 | 2.9 | 165 |
| 180 | 230 | 2.9 | 173 |

Inherent viscosity of the product was found to be 0.40. A sample of the polymer (I) resin was subjected to GPC analysis and the following values were obtained:
N.A. (PSEW) = 7,800 (mol. wt.)
W.A. (PSEW) = 37,800 (mol. wt.)
Polydispersity = 4.8
The polymer (I) made in the presence of an increased amount (1.3 times) of TOF (1.000 g) as compared to the polymer (I) made in Example 2, (0.6125 g TOF) had a higher polydispersity (4.8) compared to that of Example 2 (3.4). The polymer (I) made with the higher amount of TOF was even more unsatisfactory for use as a radiation sensitive crosslinkable polymer. This example shows that increasing the amount of TOF was detrimental and increased, rather than decreased, crosslinking of the polymer (I) during the condensation reaction.

EXAMPLE 5

Polymer (I-S) Prepared in Presence of TOF - Irganox 1010 Synergistic Inhibitor Composition (1.000 g, .0023 moles TOF + 1.352 g, .0015 mole, Irganox 1010).

The apparatus described in Example 1 was used to react 274 g. (1 mole) of di-ethyl-p-benzenediacrylate, 254 g (1.2 mole) of 1,4-di-β-hydroxyethoxycyclohexane, 10 g of ethanol containing 0.32 of tetraisopropyltitanate, and an optimum ratio of synergistic inhibitor composition of 1.000 g (0.0023 mole) of TOF and 1.352 g (0.00115 mole) of Irganox 1010 in the manner described in the preceding examples to prepare the stabilized polymer (I-S) of this invention. The ester exchange reaction was completed in 24 minutes; 106 ml of condensate (ethanol) was recovered. The torque readings at various times and temperatures during the condensation step were as follows:

| Total Time of Reaction, Min. | Reaction Temp., °C | Pressure, mm Hg. | Torque, ma |
|---|---|---|---|
| 0–24 | 178–223 | (ester exchange) | |
| 25 | 223 | Start | |
| 40 | 229 | 3.0 | 145 |
| 70 | 229 | 3.0 | 155 |
| 122 | 229 | 2.8 | 163 |
| 165 | 229 | 2.8 | 170 |

Inherent viscosity of the product was found to be 0.32. A sample of polymer (I-S) was subjected to GPC analysis and the following values were obtained:
  N.A. (PSEW) = 7,100 (mol. wt.)
  W.A. (PSEW) = 17,900 (mol. wt.)
  Polydispersity = 2.5
The polymer (I-S) was found satisfactory for use as a radiation sensitive crosslinkable copolymer for use in making lithographic plate compositions and lithographic plates with improved wear life.

EXAMPLE 5a

The preparation of homopolymer (I) of Example 5 was repeated with the exception that instead of the synergistic inhibitor composition 0.003 mole of tris-(3,5-di-t-butyl-4-hydroxy-phenyl)phosphate was used as sole inhibitor. The polydispersity of this polymer was 50% larger than the polydispersity obtained with the synergistic inhibitor composition of the invention. A lithographic printing plate was prepared using the polymer of Example 5a as the standard against which the wear-life of the lithographic printing plate using the photosensitive polymers of the invention was tested. A wear life of 37,000 imprints was obtained.

EXAMPLE 6

Preparation of Production Sized Batch of Polymer (I-S)

Plant sized equipment was used to react 32.2 kg (118 mole) of di-ethyl-p-benzenediacrylate, 26.4 kg (132 mole) of 1,4-di-β-hydroxyethoxycyclohexane, 37.4 g of tetraisopropyltitanate in the presence of 52.6 g (0.12 mole) of TOF and 71.2 g (0.061 mole) of Irganox 1010 substantially in the manner described for the laboratory-sized batches in the preceding example 5 to prepare stabilized polymer (I-S) of this invention. The ester exchange reaction was completed in 2.25 hours. A total of 8.2 kg of condensate was recovered. The torque readings at various times and temperatures during the condensation step were as follows:

| Total Time of Reaction, Min. | Reaction Temp., °C | Pressure, mm Hg. | Relative Torque Reading |
|---|---|---|---|
| 0–114 | 167–197 | (ester exchange) | |
| 115 | 197 | | |
| 155 | 203 | start | 200 |
| 235 | 202 | 0.80 | 200 |
| 250 | 203 | 0.65 | 212 |
| 270 | 203 | 0.65 | 215 |
| 293 | 203 | 0.60 | 235 |

Inherent viscosity of the product was found to be 0.34. A sample of the product, polymer (I-S), was subjected to GPC analysis and the following values were obtained:
  N.A. (PSEW) = 8,600 (mol. wt.)
  W.A. (PSEW) = 18,900 (mol. wt.)
  Polydispersity = 2.18
This stabilized polymer exhibited superior physical properties compared to the polymer (I) of Examples 1–4. Lithographic plates made with a plate composition containing the polymer (I-S) also were found to have superior properties when tested. The superior properties are indicative of a minimum amount of crosslinking, or branching, of the polymer during its condensation during the manufacture process.

EXAMPLE 7

Copolymer (II) Prepared in Absence of Inhibitor

Using the apparatus described in Example 1, 254.8 g (0.97 mole) of di-ethyl-p-benzenediacrylate, 224.4 g (1.12 mole) of 1,4-di-β-hydroxyethoxycyclohexane, and 30.45 g (0.07 mole) dimethyl-3,3'-[(sodio-imino)disulfonyl]dibenzoate were reacted substantially in the manner described in Example 1. The ester exchange step of the reaction was completed in about 40 minutes. 95 ml of condensate were recovered. The torque readings at various times and temperatures during the condensation step of the reaction were as follows:

| Total Reaction Time, Min. | Reaction Temp., °C. | Pressure mm Hg. | Torque, ma |
|---|---|---|---|
| 0–39 | 194–225 | (ester exhange) | |
| 40 | 225 | Start | 160 |
| 70 | 229 | full | 170 |
| 100 | 223 | " | 205 |
| 130 | 220 | " | 250 |
| 164 | 225 | " | 360 |
| 170 | 225 | " | 390 |

Upon analysis of samples of the copolymer (II) product, the following results were obtained:
  Inherent viscosity = 0.63
  N.A. PSEW = 5,900 (mol. wt.)
  W.A. PSEW = 10,500 (mol. wt.)
  Polydispersity = 1.77
The absence of any inhibitor during the polymerization resulted in a considerable amount of crosslinking. However, contrary to the insolubility obtained in the corresponding experiment with the homopolymer in Example 1, the copolymer of the present Example 7 remained substantially soluble in the solvent mixture phenol-chlorobenzene used for the I. V. determination. The presence of crosslinked polymer chains increased the I. V. considerably above the value that would be expected for a comparable non-crosslinked condensation polymer.

The less polar solvent used for the GPC analysis, tetrahydrofuran, is apparently incapable of dissolving the crosslinked polymer chains. Thus, the calculated weight average molecular weight is lower than it would be, if no crosslinking had occurred.

EXAMPLES 8-10

Preparation of Copolymer (II) and Copolymer (II-S)

Three batches of copolymer (II) were prepared with and without the synergistic inhibitor composition of the invention, using the laboratory reactor of Example 1 and the procedure of Example 7. Samples of each batch were analyzed to determine inherent viscosity, N.S. (PSEW) and W.A. (PSEW). The results are listed in Table 1, along with the results from Example 7.

Table I

| Ex. No. | Stabilizer System | | I.V.* | Mol. Wt. W.A. (PSEW) |
|---|---|---|---|---|
| | TOF, g. | Irganox 1010 g. | | |
| 7 | 0 | 0 | 0.63 | 10,500 |
| 8 | 0.46 | 0 | 0.50 | 11,600 |
| 9 | 0 | 0.63 | 0.50 | 10,900 |
| 10 | 0.46 | 0.63 | 0.50 | 12,400 |

*I.V. = Inherent Viscosity

Comparison of the data from Examples 8-10 in Table I shows that the average molecular weight, W.A. (PSEW), for the copolymers is highest when both TOF and Irganox 1010 are present during the copolymerization reaction, and the condensation reaction is carried out until the same inherent viscosity for each batch of copolymer is obtained. The product from Example 10 is copolymer (II-S) made according to the invention. Also, the data show that while there is some increase in the values for W.A. (PSEW) in both Examples 8 and 9 (in comparison to Example 7), neither use of Irganox 1010 alone (Example 9), nor use of TOF alone (Example 8) is as effective as use of the combination of the two materials (Example 10).

EXAMPLE 11

Preparation of Production Sized Batches of Copolymer (II-S)

Plant sized equipment was used to prepare copolymer (II-S) to confirm that the benefits of using the synergistic stabilizer system of the invention are obtained when larger-than-laboratory scale sized equipment is used to carry out the preparation. A reactor vessel having an operating capacity of 35 gallons was used to react 28.8 kg. of di-ethyl-p-benzene diacrylate, 25.3 kg. of 1,4-di-β-hydroxyethoxycyclohexane, and 3.4 kg. of dimethyl-3,3-[sodio-imino)disulfonyl)]dibenzoate in the presence of 9.8 g. of zinc acetate, 37.35 g. of tetraisopropyltitanate, 7.40 g. of sodium acetate, 26.10 g. of TOF and 35.4 g. of Irganox 1010. Six batches of copolymer (II-S) were prepared and the products blended together. Typically, the ester exchange step of the reaction was completed in about 140 minutes. The torque readings obtained during the condensation step of the reaction typically were as follows. The polymeric products attained an inherent viscosity of 0.45 in each batch.

| Total Reaction Time, Min. | Reaction Temp., ° C. | Pressure mm Hg. | Relative Torque Reading |
|---|---|---|---|
| 0–141 | 201–205 | (ester exchange) | |
| 142 | 206 | start | 205 |
| 264 | 208 | 2.5 | 220 |
| 290 | 208 | 0.15 | 220 |
| 305 | 209 | 0.15 | 243 |
| 335 | 209 | 0.20 | 285 |
| 365 | 209 | 0.22 | 375 |
| 391 | 209 | 0.20 | 475 |

Analyses of the blended products determined the following characteristics of the copolymer (II-S) blend:

Repeating units (II) expressed as equivalent mole percent of dimethyl-3,3'-[(sodio-imino)disulfonyl)-]dibenzoate in the polymer = 6.4%

Inherent viscosity = 0.45

N.A. (PSEW) = 7,200 (mol. wt.)

W.A. (PSEW) = 13,100 (mol. wt.)

Polydispersity = 1.81

The analytical data of Example 11 show that the inhibitor pair of the invention gives even better results in the production scale experiment that in the corresponding laboratory scale experiment of Example 10.

The I. V. value of the copolymer of Example 11 is in the desired range and the weight average molecular weight is sufficiently high to indicate predominance of the polycondensation polymer.

The usefulness of the copolymer of Example 11 in a photosensitive layer of a ligthographic printing plate is shown in the following Example 12 on page 68. Although its wear-life is somewhat inferior to that of the homopolymer of Example 6, it provides for a greatly improved lithographic printing plate compared to the plate using the photosensitive homopolymer (comparison standard) of Example 5a.

The above characteristics confirm that the laboratory scale practice of the invention, as shown in Example 10, was successfully practiced on a production scale. The average molecular weight data compare even more favorably with the corresponding values for Examples 7–10 in Table I.

Use of Polymer (I-S) and Copolymer (II-S) in Coating Compositions for Lithographic Plates Coating compositions containing a stabilized crosslinkable polymer of this invention can be prepared by dispersing or dissolving the polymer (I-S) or copolymer (II-S) in any suitable solvent or combination of solvents used in the art to prepare polymer dopes. The solvents are chosen to be substantially unreactive toward the crosslinkable polymers within the time period contemplated for maintaining the solvent and polymer in association and are chosen to be compatible with the substrate employed for coating. While the best choice of solvent will vary with the exact polymer and application under consideration, exemplary preferred solvents include benzyl alcohol, cyclohexanone, dioxane, 2-methoxyethyl acetate, N,N'-dimethyl-formamide, chloroform, trichloroethylene, 1,2-dichloroethane, methylene dichloride, 1,1-dichlorethane, 1,1,2-trichloroethane, tetrachloroethane, chlorobenzene and mixtures thereof. It is appreciated that crosslinkable polymers of the present invention are also soluble in aqueous alkaline solutions and, more specifically, the developers hereinafter more fully described. While these can be used as solvents for the coating compositions, their use is not preferred where a relatively rapid and complete separation of the solvent from the crosslinkable polymer is contemplated, as in typical coating applications in which the solvent is intended to be volatilized.

Optimum concentrations of the crosslinkable polymers in the coating solutions are dependent upon the specific polymer as well as the support and the coating method employed. Particularly useful coatings are obtained when the coating solutions contain about 1 to 50 percent by weight, and, preferably, about 2 to 10 percent by weight, crosslinkable polymer. Higher concentrations, of course, give satisfactory results.

Radiation-sensitivity can be stimulated in the coating composition by incorporating a sensitizer. Suitable sensitizers include anthrones, such as 1-carbethoxy-2-keto-3-methyl-2-azabenzanthrone, benzanthrone and those anthrones disclosed in U.S. Pat. No. 2,670,285; nitro sensitizers such as those disclosed in U.S. Pat. No. 2,610,120; triphenylmethanes such as those disclosed in U.S. Pat. No. 2,690,966; quinones such as those disclosed in U.S. Pat. No. 2,670,286; cyanine dye sensitizers; naphthone sensitizers such as 6-methoxy-beta-2-furfuryl-2-acrylonaphthone; pyrylium or thiapyrylium salts, such as 2,6-bis(p-ethoxyphenyl)-4-(p-n-amyloxyphenyl)-thiapyrylium perchlorate and 1,3,5-triphenylpyrylium fluoroborate; furanone; anthraquinones such as 2-chloroanthraquinone; thiazoles such as 2-benzoylcarbethoxymethylene-1-methyl-betanaphthothiazole and methyl 2-(N-methylbenzothiazolylidene) dithioacetate; methyl 3-methyl-2-benzothiazolidene dithioacetate; thiazolines such as 3-ethyl-2-benzoylmethylenenaphtho[1,2-d]-thiazoline, benzothiazoline, (2-benzoylmethylene) 1-methyl-beta-naphthothiazoline; 1,2-dihydro-1-ethyl-2-phenacylidenenaphtho[1,2-d]-thiazole; and naphthothiazoline; quinolizones, Michler's ketone; and Michler's thioketone as well as other sensitizers, such as those disclosed in French Pat. Nos. 1,238,262; 1,089,290 and 1,086,257 and U.S. Pat. Nos. 2,732,301; 2,670,285 and 2,732,301.

The crosslinkable polymers of this invention such as those incorporating one or more of the repeating units (I) formed from compounds A through D are directly responsive to actinic radiation. The sensitizers noted above are merely used to enhance this responsiveness. The crosslinkable polymers of this invention need not, however, be directly crosslinked in response to exposure to actinic radiation. The crosslinkable polymers can be crosslinked by employing radiation-responsive sensitizers that act as crosslinking agents, such as ketone-type and azide-type sensitizers. Typical aryl ketone sensitizers include such compounds as benz(a)-anthracene-7,12-dione and 4,4'-bis(dimethylamino)benzophenone. Other advantages ketone-type sensitizers are, for example, 4,4'-tetraethyldiaminodiphenyl ketone, dibenzalacetone and 4,4'-bis(dimethylamino)benzophenone imide, as well as additional sensitizers of the type described in U.S. Pat. No. 2,670,287.

Azide-type sensitizers useful herein include a wide variety of aryl azides, such as those of British Pat. Nos. 767,985; 886,100 and 892,811, which are desirable sensitizers for negative-working elements. Additionally, the sensitizers of U.S. Pat. No. 2,940,853 can also be suitably employed in a like manner. Particularly useful aryl azide sensitizers are bisaryl azides such as 2,6-bis(p-azidobenzylidene)-4-methylcyclohexanone. Other advantageously employed azide sensitizers which promote crosslinking are well known in the art.

The sensitizer can be present in the coating composition in any desired concentration effective to stimulate crosslinking in response to radiation or can be omitted entirely where the crosslinking polymer is itself radiation-sensitive. It is generally preferred to incorporate the sensitizer in a concentration of from 0.01 to 20 percent by weight based on the weight of the crosslinkable polymer. Still higher concentrations of sensitizer can be incorporated without adverse effect.

In addition to the sensitizers a number of other addenda can be present in the coating composition and ultimately form a part of the completed radiation-responsive element. It is frequently desirable to incorporate pigments and dyes into the coating composition for the purpose of producing a coating of a desired color or degree of constant to a given support or background. Exemplary preferred dyes useful for this purpose are those set forth in Table I.

TABLE I

| EXEMPLARY PREFERRED DYES | | |
|---|---|---|
| Class | Dye Name | CI No. |
| Monoazo | 1. Fast Acid Red BL | 17045 |
|  | 2. Eastone Red R | — |
| Diazo | 1. Oil Red O | 26125 |
|  | 2. Sudan III | 26100 |
|  | 3. Sudan IV | 26105 |
| Methine | 1. Genacryl Red 6B | 48020 |
|  | 2. Genacryl Orange R | 48040 |
|  | 3. Celliton Yellow 5G | — |
| Anthraquinone | 1. Alizarin Light Red Base | 68215 |
|  | 2. Sevron Blue 2G | — |
|  | 3. Anthraquinone Violet 3RN | — |
| Triarylmethane | 1. Astrazon Blue B | 42140 |
|  | 2. Victoria Blue B Base | — |
|  | 3. Brilliant Green Crystals | 42040 |
| Thiazine | 1. Methylene Blue A Ex Conc. | — |
| Xanthene | 1. Rhodamine 6G | — |
|  | 2. Rhodamine 3B Extra | 45175 |
|  | 3. Xylene Red | 45100 |
| Phthalocyanine | 1. Azosol Fast Blue HLR | — |
|  | 2. Monastral Blue Pigment 15 | 74160 |
| Azine | 1. Safranin-O | 50240 |

By choosing the dye or pigment to contrast with the background provided by its supporting surface, the coating layer produces a readily visible image upon exposure and development. In many instances, however, it is desirable to have a visible indication of exposure before development. This can be a convenience in many instances, such as in step and repeat exposure operations, where the coated elements are stored for some time between exposure and development or where it is desirable to evaluate the image achieved by exposure before development. To provide this capability it is frequently desirable to include in the coating composition an indicator dye that is capable of either printout or bleachout on exposure of the radiation-sensitive coating produced therefrom. A wide variety of useful exposure indicator dyes are known to the art which can be employed. Preferred exposure indicator dyes include photochromic dyes such as spirobenzopyrans (e.g. 3',3'-dimethyl-6-nitro-1'-phenylspiro[2H-1]benzopyran-2,2'- indoline, 5'-methoxycarbonyl-8-methoxy-1',3',3'-trimethyl-6-nitrospiro[2H-1]benzopyran-2,2'-indoline, and the like); leuco dye and activator combinations--e.g. dyes like tris(N,N-dipropylaminophenyl)methane, tris(N,N-diethylaminophenyl)methane, tris(N,N-dimethylaminophenyl)methane and the like in combination with activators such as N-methoxide activators (e.g. N-methoxy-4-methylpyridinium-p-toluenesulfonate) and halogenated compounds (e.g. carbon tetrabromide); pH sensitive dyes such as bis[4,4'-bis(dimethylamino)-benzyhydrol] ether useful in combination with the leuco dye activators noted above; and cyanine dyes such as disclosed in Mitchell U.S. Pat. No. 3,619,194.

It is recognized that stabilized polymers of this invention can become crosslinked prior to intended exposure if the compositions or elements of this invention are stored at elevated temperatures, in areas permitting exposure to some quantity of actinic radiation and/or for extended periods. To insure further against crosslinking the polymers inadvertently before intended exposure to actinic radiation, usual stabilizers can be incorporated into the radiation-sensitive compositions and coated layers of this invention. Useful stabilizers include phenols, such as 2,6-di-tert.-butyl-p-cresol, 2,6-di-tert-butylanisole and p-methoxyphenol; hydroquinones, such as hydroquinone, phloroglucinol and 2,5-di-tert-butylhydroquinone, triphenylmethallics, such as triphenylarsine; triphenylstilbene; and tertiary amines, such as N-methyldiphenylamine. Because of their low boiling points and/or thermal instabilities, these stabilizers are not suitable for use in the polymerization reactions involved in preparation of polymer (I-S) and copolymer (II-S).

As is well understood in the art, the above addenda which together with the radiation-sensitive polymers make up the radiation-sensitive layer finally produced are present in only a minor concentration. Individual addenda are typically limited to concentrations of less than about 5 percent by weight of the radiation-sensitive layer.

Particularly advantageous coating compositions contain at least one other film-forming polymeric resin in addition to the stabilized crosslinkable polymers of this invention. These additional polymeric resins are typically not radiation-sensitive, although mixtures of radiation-sensitive resins can be employed and are usually selected from those resins which are soluble in the coating solvent. The amount of resin employed can be varied, depending upon the resin, the crosslinkable polymer, the coating solvent, and the coating method and application chosen. Useful results can be obtained using coating compositions containing up to 5 parts of resin per part of stabilized crosslinkable polymer on a weight basis. Generally preferred coating compositions are those that contain from 0.05 to 1.0 part resin per part of the crosslinkable polymer on a weight basis.

Exemplary of preferred film-forming resins useful in the coating compositions of this invention are phenolic resins, such as novolac and resole resins. These resins are particularly useful in improving the resistance of coatings to etchants when the coating composition is used as a photoresist composition. Where it is desired to control wear resistance or other physical properties of the coatings produced from the coating composition, as in lithographic and relief plates, it can be desirable to incorporate resins, such as epoxy resins; hydrogenated resin; poly(vinyl acetals); and acrylic polymers and copolymers, such as poly(methyl methacrylate), acrylates of the type disclosed in British Pat. No. 1,108,383, poly(alkylene oxides) and polystyrenes. The stabilized crosslinkable polymers of this invention are also generally compatible with linear polyesters.

Elements bearing radiation-sensitive layers can be prepared by forming coatings with the coating composition and removing the solvent by drying at ambient or elevated temperatures. Any one of a variety of conventional coating techniques can be employed, such as spray coating, dip coating, whirl coating, roller coating, etc.

Suitable support materials can be chosen from among a variety of materials which do not directly chemically react with the coating composition. Such support materials include fiber base materials such as paper, polyethylene-coated paper, polypropylene-coated paper, parchment, cloth, etc.; sheets and foils of such metals as aluminum, copper, magnesium, zinc, etc.; glass and glass coated with such metals as chromium, chromium alloys, steel, silver, gold, platinum, etc.; synthetic resin and polymeric materials such as poly(alkyl acrylates), e.g. poly(methyl methacrylate), polyester film base —e.g. poly(ethylene terephthalate), poly(vinyl acetals), polyamides—e.g. nylon and cellulose ester film base —e.g. cellulose nitrate, cellulose acetate, cellulose acetate propionate, cellulose acetate butyrate and the like.

Specific support materials which are useful in forming printing plates, particularly lithographic printing plates, include supports such as zinc, anodized aluminum, grained aluminum, copper and specially prepared metal and paper supports; superficially hydrolyzed cellulose ester films; and polymeric supports such as polyolefins, polyesters, polyamide, etc.

The supports can be preliminarily coated, i.e. before receipt of the radiation-sensitive coating, with known subbing layers such as copolymers of vinylidene chloride and acrylic monomers, e.g. acrylonitrile, methyl acrylate, etc. and unsaturated dicarboxylic acids such as itaconic acid, etc.; carboxymethyl cellulose; gelatin; polyacrylamide; and similar polymer materials.

The support can also carry a filter or antihalation layer composed of a dyed polymer layer which absorbs the exposing radiation after it passes through the radiation-sensitive layer and eliminates unwanted reflection from the support.

The optimum coating thickness of the radiation-sensitive layer will depend upon such factors as the use to which the coating will be put, the particular radiation-sensitive polymer employed, and the nature of other components which may be present in the coating. Typical coating thicknesses can be from about 0.05 to 10.0 microns or greater, with thicknesses of from 0.1 to 2.5 microns being preferred for lithographic printing plate applications.

The photographic elements of this invention can be exposed by conventional methods, for example, through a transparency or a stencil, to an imagewise pattern of actinic radiation which is preferably rich in ultraviolet light. Suitable sources include carbon arc lamps, mercury vapor lamps, fluorescent lamps, tungsten filament lamps, lasers and the like. The elements of this invention can be handled and viewed in light above about 500 nm in wavelength, as is conventional practice.

The exposed radiation-sensitive elements of this invention can be developed by flushing, soaking, swabbing or otherwise treating the radiation-sensitive layer with a solution (hereinafter referred to as a developer)

which selectively solubilizes (i.e., transports) the unexposed areas of the radiation-sensitive layers.

The developer can be a conventional developer composition of the type described in the prior art for developing radiation-sensitive layers containing a crosslinkable polymer of type (I) or type (II) described herein. In a preferred form, the developer used to develop a layer containing a stabilized polymer (I-S) or (II-S) of this invention is a developer composition such as one of those described in Martinson et al, U.S. Pat. No. 3,707,373, issued Dec. 26, 1972. Such a preferred developer composition comprises (1) a lactone solvent which will remove polymer coating from unexposed areas of an exposed radiation-sensitive layer without substantially swelling the polymer coating in the exposed areas, and (2) an acid which prevents formation of stain and scum in hydrophilic areas of the layer. The composition also preferably contains a wetting agent. Typical lactone solvents which may be used in the developer are butyrolactone, valerolactone, and hexanolactone.

Typical acids which can be used in the developer are phosphoric acid, hydrochloric acid, lactic acid, glycolic acid, acetic acid and α-pentanoic acid. Typically the amount of acid added to the developer composition is about 1:5 percent by volume, based on the amount of solvent employed. The amount of acid used should be sufficient to provide a developer composition with a pH of between 2 and 6. When the crosslinkable polymer in the radiation-sensitive layer is polymer (I-S), the amount of acid present in the developer composition preferably is about 2% by volume. When the crosslinkable polymer in the radiation-sensitive layer is polymer (II-S), the amount of acid present in the developer composition is preferably about 5% by volume.

Typical wetting agents which can be used in the composition are polyhydric alcohols, polyethers and esters of inorganic acids. Suitable wetting agents include polyhydric alcohols such as glycerol, pentaerythritol, diethylene glycol, triethylene glycol, aligomeric poly(ethylene glycols), etc; esters of inorganic acids such as phosphate esters of such alkanols as n-hexanol, n-octanol, n-decanol, etc.; phosphate esters of such alkoxyalkanols as 2-n-octyloxyethanol, 2-n-decyloxyethanol, etc.; mixtures of such phosphate esters, etc; esters of organic acids such as the dioctyl esters of sodium sulfosuccinic acid; polyethers such as octyl phenoxy polyethoxyethanol, ethylene oxide polymers, nonyl phenyl polyethylene glycol ether, etc.; and the like; as well as commercially available materials sold under such trademarks as "Zonyl A," "Triton X-35," "Triton X-45," "Surfynol 450," "Aerosol OT," "Tergitol 15," etc. The amount of these materials added to the developer composition will of course depend upon the particular agent employed and its characteristics. Typically they can be employed in amounts of about from 1 to 10 percent by volume based on the amount of solvent.

The developer composition will also preferably contain an oloephilicity improving agent. Suitable oleophilicity improving agents include resinous materials such as hydrogenated rosin esters, colophoney. etc. and organic esters such as methyl abietate, etc. As with the wetting agent, the amount of the oleophilicity improving agent added to the developer composition will depend upon the particular agent employed. From about 1 to 15 percent by volume, based on the amount of solvent present, will usually give satisfactory results.

In addition to the above components it is often desirable to add a minor amount of a basic amine, such as triethanolamine, to the developer composition to aid in eliminating background stain and scumming. About 5 to 15 percent by volume, based on the amount of solvent employed, is typical of the amount of amine which can be added to the developer composition.

This developer composition can optionally also contain additional addenda, for example, dyes and/or pigments, as is conventional. In practice the exposed element, for example, a lithographic printing plate, is developed with the developer compositions of this invention by applying the developer composition to the exposed surface of the element for a period of time sufficient to remove the polymer from unexposed areas. Gentle mechanical action aids in removing the polymer composition from such unexposed areas. Thus, swabbing is a highly useful method of applying the developer composition. The developer composition has sufficient activity that it can be employed at room temperature, or it can be employed at elevated temperatures up to about 90° F. After the initial application of the developer composition a second application can be applied, followed by either single or double application of a desensitizing composition. The element is then dried.

The element can then be treated in any known manner consistent with its intended use. For example, printing plates are typically subjected to desensitizing etches. Where the developed radiation-sensitive coating layer forms a resist layer, the element is typiclly subjected to acidic or basic etchants and to plating baths.

The invention is further illustrated by the following example.

EXAMPLE 12

Use of Polymers (I-S) and (II-S) in Lithographic Plate Preparation

Typical coating formulations for making lithographic plates prepared from a homopolymer (I-S) or a copolymer (II-S) can be formulated as follows:

Lithographic Plate Coating Composition 25 grams polyester polymer (I-S) or copolymer (II-S) prepared as described in Examples 5–11
1.0 gram (2-benzoylmethylene-1-ethyl-B-naphthothiazoline*
1.0 gram butylated hydroxy toluene
3.75 grams Monastral Blue BF pigment **
600 mls. dichloroethane

* spectral sensitizer
** C. I. 74160, Cu Phthalocyanine Complex

The above ingredients are mixed together to form a homogeneous solution of the polyester, containing dispersed pigment, which upon evaporation of the solvent leaves a deposit of the cross-linkable radiation-sensitive polymer. The coating composition is filtered through a coarse filter paper. The filtered solution is coated at 1.8 ml/ft² wet lay-down coverage on grained, phosphoric acid anodized aluminum support (see U.S. Pat. No. 3,511,611, issued May 12, 1970) utilizing a drum sample coater. The deposit is dried at 160° F (71°C) for about 2 minutes.

The dried coating is exposed imagewise to a line negative on a Xenon source exposure device commercially available under the trademark NuArc Top Platemaker. The exposed plate is swab-developed by applying to the plate surface a developer having a composition as shown below and allowing it to soak 15 seconds, followed by swabbing for 30 seconds.

Plates made with polymer (I-S) preferably are developed using a developer having the following composition:

| | |
|---|---|
| 4-butyrolactone | 1000.0 ml |
| Glycerol | 100.0 ml |
| Methyl abietate | 10.0 ml |
| Hydrogenated wood rosin (Staybelite resin, Hercules Powder Co.) | 1.0 g |
| Wetting agent (Zonyl A, DuPont) | 10.2 ml |
| Distilled Water | 20.0 ml |
| Phosphoric acid (85 percent) | 25.0 ml |
| Glacial acetic acid | 25.0 ml |

Plates made with polymer (II-S) preferably are developed using a developer having the following composition:

| | |
|---|---|
| 4-butyrolactone | 1000.0 ml |
| Glycerol | 100.0 ml |
| Methyl abietate | 10.0 ml |
| Hydrogenated wood rosin (Staybelite resin, Hercules Powder Co.) | 1.0 g |
| Wetting agent (Zonyl A, DuPont) | 10.2 ml |
| Distilled water | 20.0 ml |
| Phosphoric acid (85 percent) | 84.5 ml |
| Glacial acetic acid | 25.0 ml |

Desensitizer gum is then applied to the plate and dried. The lithographic plate so made is then tested to determine its acceptability for use in a printing press.

Lithographic plates made from compositions containing polymer (I-S) or polymer (II-S) have good lithographic properties (as indicated by complete linking of image areas and absence of scum on the non-image areas), good keeping qualities (as indicated by lack of increase in Brookfield viscosity readings during storage of dopes about 3 months), good relative speeds (as indicated by very little decrease in relative speed of crosslinking on exposure of the sensitized radiation-sensitive polymers to ultra-violet light, a procedure described, for example, in U.S. Pat. No. 3,453,237), and good wear lives (as indicated by the number of clear printing impressions which can be made before the plate begins to deteriorate from wear). Wear life is an indication of the general acceptability of polymer (I-S) or polymer (II-S) for use in lithographic plate compositions. For example, the wear life of a lithographic plate made with polymer (I-S) of Example 6, above, was found to be about 267% of that of a previously made "standard" lithographic plate made from polymer (I) made according to the method of Example 1, but containing as an inhibitor compound tris(3,5-di-t-butyl-4-hydroxyphenyl)phosphate, as disclosed in Example 5a thereof. Whereas the standard plate was found to have a wear life of 37,000 imprints the plate made with polymer (I-S) of Example 6 had a wear life of over 98,000 imprints. In the same series of tests, plates made from polymer (II-S) had wear lives of from about 55,000 to about 59,000 imprints compared with 37,000 of the "standard" plate. While wear tests are subject to many variables, they are a fairly reliable indicator of the acceptability of a particularly crosslinkable radiation-sensitive polymer for use in a lithographic plate composition. By all the above indicators and, especially by the wear test, polymer (I-S) and polymer (II-S) of this invention have been found to provide advantages over the previously made inhibited polymer (I) and polymer (II) for use in lithographic plate compositions.

The invention has been described in detail with particular reference to preferred embodiments thereof but it will be understood that variations and modifications can be effected within the spirit and scope of the invention. For example, although the synergistic inhibitor composition of this invention has been described in its use in the preparation of photocrosslinkable condensation polyesters, it is to be understood that the composition can also be used in the preparation of other polyesters and other polymers which require inhibition against crosslinking and branching and/or stabilization from temperature degradation and oxidation. Such other polymers include polyolefins, e.g., polyethylene and polypropylene. They also include ether-glycol modified polyesters made from diols and carboxylic acids or their derivatives, e.g., ether-glycol modified poly(ethylene terephthalate) containing from 0.05 to 1.5 mole percent of polyethylene glycol in the polymeric molecule.

I claim:

1. A radiation-sensitive element comprising a support having thereon a coating which comprises:

a radiation-sensitive condensation polyester formed from
1) at least one diol; and
2) at least one diacid or a functional derivative thereof containing at least one non-aromatic ethylenic-bond-containing group which is capable of crosslinking upon exposure to actinic radiation and has the formula wherein $R_s$ is an unsubstituted or substituted aliphatic or cycloaliphatic hydrocarbon group having 2 to 7 carbon atoms and a crosslinkable ethylenic bond; said condensation polyester being formed in the presence of a combination of:

(a) at least one hindered phenol having the formula:

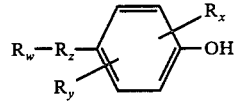

wherein $R_w$ is a functional group capable of participating in ester interchange and polycondensation reactions that occur during formation of said condensation polyester, $R_x$ and $R_y$ are alpha-branched alkyl radicals containing 3–20 carbon atoms, alpha-branched aralkyl radicals containing 7–20 carbon atoms, or cycloalkyl radicals containing 6–20 carbon atoms and $R_z$ is a divalent hydrocarbon radical containing from 1 to 3 carbon atoms; and (b) at least one phosphoric acid ester having the formula

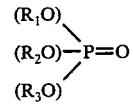

wherein each of $R_1$, $R_2$ and $R_3$ is a hydrocarbon radical having from 6 to 8 carbon atoms, said $R_1O$, $R_2O$ and $R_3O$ groups being capable of participating in ester interchange and polycondensation reactions that occur during the formation of said condensation polyester, said phosphoric acid ester (b) and hindered phenol (a) being present in said combination in a molar ratio which provides

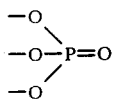

and phenolic hydroxy groups in a ratio in the range of from 1:1 to 1:6, respectively, said (a) and (b) compounds being thermally stable and substantially non-volatile at temperatures in the range of from about 250° to about 300° C; and said radiation-sensitive condensation polyester having an inherent viscosity of from about 0.2 to about 1.0 and a polydispersity ratio of from about 1.8 to 3.4.

2. The radiation-sensitive element of claim 1 wherein said diol is a polyhydric alcohol having the formula HO—$R^5$—OH wherein $R^5$ is a divalent organic radical having from 2 to 12 carbon atoms.

3. The radiation-sensitive element of claim 2 wherein said condensation polyester is additionally formed from at least one aromatic dicarboxylic acid providing repeating units having the formula:

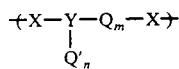

wherein X is a carbonyl group, n and m are integers whose sum equals 1, Q has the formula:

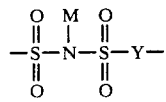

Q' has the formula:

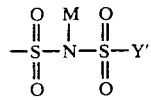

Y is an arylene group or arylidyne group, Y' is an alkyl, aryl, alkaryl or aralkyl group, in which each of the alkyl moieties includes from 1 through 12 carbon atoms, and M is an alkali metal or ammonium cation, said aromatic dicarboxylic acid having the formula

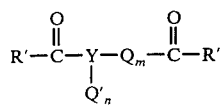

wherein R' is hydroxyl, oxy atom linkage where the compound is an acid anhydride, halogen atom, or an alkoxy radical where the compound is in the form of an ester, and Y, Q, Q', m and n are as defined above; and wherein said phosphoric acid ester (b) and hindered phenol (a) are present in a molar ratio which provides

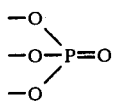

and phenolic hydroxy groups in a ratio of about 1:2, respectively.

4. The radiation-sensitive element of claim 1 wherein said diacid or functional derivative is at least one of the following:

(i) a cinnamic acid or a derivative thereof having the formula:

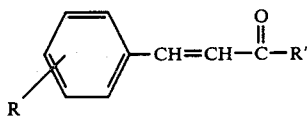

wherein R is one or more alkyl, aryl, aralkyl, alkoxy, nitro, amino, acylic or carboxyl groups or hydrogen or halogen atoms and provides at least one condensation site, and R' is hydroxyl, oxy atom linkage where the compound is an acid anhydride, halogen atom, or an alkoxy radical where the compound is an ester;

(ii) a dicarboxylic acid or a functional derivative thereof having the formula:

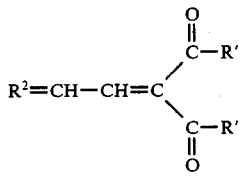

wherein $R^2$ is an alkylidene, aralkylidene or heterocyclic group, or a derivative thereof and R' is as previously defined;

(iii) a muconic acid or a functional derivative thereof defined by the formula:

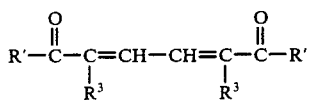

wherein R' is as previously defined and $R^3$ is a hydrogen atom or a methyl group;

(iv) an unsaturated carbocyclic dicarboxylic acid or a functional derivative thereof defined by the formula:

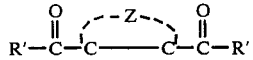

wherein R' is as previously defined and Z represents the atoms necessary to form an unsaturated, bridged or unbridged cycloaliphatic nucleus having 6 to 7 carbon atoms; or (v) mixtures of two or more of any of said compounds.

5. The radiation-sensitive element of claim 4 wherein said aromatic dicarboxylic acid comprises from about 2 to about 45 mole percent of total diacids and functional derivatives thereof.

6. The radiation-sensitive element of claim 1 wherein $R_w$ is $R_sO-$ or

and $R_s$ is hydrogen or a radical selected from those defined for $R_x$ and $R_y$.

7. The radiation-sensitive element of claim 1 in which said coating also comprises a sensitizer to stimulate crosslinking of said radiation-sensitive condensation polyester in response to actinic radiation.

8. The radiation-sensitive element of claim 1 wherein the support is hydrophilic and said element is a lithographic printing plate.

9. The radiation-sensitive element of claim 1 wherein said phosphoric acid ester (b) and hindered phenol (a) are present in a molar ratio which provides

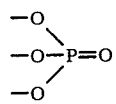

and phenolic hydroxy groups in a ratio of about 1:2, respectively; and wherein said condensation polyester has an inherent viscosity between 0.30 and 0.55 and a polydispersity between 1.8 and 2.5.

10. The radiation-sensitive element of claim 1 wherein said diols are selected from the group consisting of ethylene glycol, diethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, neopentyl glycol, 1,4-cyclohexanedimethanol, 1,4-bis-($\beta$-hydroxyethoxy)cyclohexane, and a mixture of two or more of said diols; and said diacids or functional derivatives thereof are selected from the group consisting of p-phenylenediacrylic acid; di-ethyl-p-benzenediacrylate; cinnamylidenemalonic acid; 2-butenylidenemalonic acid; 3-pentenylidenemalonic acid; o-nitrocinnamylidenemalonic acid; naphthylallylidenemalonic acid; 2-furfurylideneethylidenemalonic acid; N-methyl-pyridylidene-2-ethylidenemalonic acid; N-methyl-quinolidene-2-ethylidenemalonic acid; N-methylbenzothiazolyidene-2-ethylidenemalonic acid, 4-cyclohexene-1,2-dicarboxylic acid; 5-norbornene-2,3-dicarboxylic acid, hexachloro-5[2:2:1] bicycloheptene-2,3-dicarboxylic acid; trans, trans-muconic acid; cis, transmuconic acid; cis, cis-muconic acid; $\alpha,\alpha'$-cis, trans-dimethylmuconic acid; $\alpha,\alpha'$-cis, cis-dimethylmuconic acid; 1,3-cyclohexadiene-1,4-dicarboxylic acid; 1,3-cyclohexadiene-1,3-dicarboxylic acid, 1,3-cyclohexadiene-1,2-dicarboxylic acid; 1,5-cyclohexadiene-1,4-dicarboxylic acid; 1,5-cyclohexadiene-1,3-dicarboxylic acid, alkylated arylated derivatives of such dicarboxylic acids; and a mixture of any two or more thereof.

11. The radiation sensitive element of claim 10 wherein said coating also comprises a sensitizer to stimulate crosslinking of said radiation-sensitive condensation polyester in response to actinic radiation.

12. The radiation-sensitive element of claim 11 wherein said hindered phenol is selected from the group consisting of n-octadecyl-3-(3,5-di-t-butyl-4-hydroxyphenyl)-propionate; 5,5-bis(5-t-butyl-2,3-dimethyl-4-hydroxybenzyl)-dithioterephthalate; 4-hydroxymethyl-2,6-di-t-butyl phenol; 2,6-di-t-butyl-$\alpha$-dimethylamino-p-cresol; tetrakis-[methylene 3-(3,5-di-tert-butyl-4-hydroxyphenyl)propionate]methane; tetrakis-[methylene 3-(3-tert-butyl-5-methyl-4-hydroxyphenyl)propionate]methane; and a mixture of any two or more theeof; and said phosphoric acid ester is selected from the group consisting of trioctyl phosphate, tri(2-ethylhexyl phosphate, 2- and 4-tritolylphosphate, 2,2,4-(trimethylpentyl)phosphate, tris(2,5-dimethylpentyl)-phosphate, triphenylphosphate, and a mixture of two or more thereof.

13. The radiation-sensitive element of claim 12 wherein the support is hydrophilic and said element is a lithographic printing plate.

14. A radiation-sensitive element comprising a support having thereon a coating which comprises:
a radiation-sensitive condensation polyester formed from
(1) at least one diol;
(2) at least one diacid or a functional derivative thereof containing at least one non-aromatic ethylenic-bond-containig group which is capable of crosslinking upon exposure to actinic radiation and has the formula

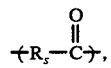

wherein $R_s$ is an unsubstituted or substituted aliphatic or cycloaliphatic hydrocarbon group having 2 to 7 carbon atoms and a crosslinkable ethylenic bond; and (3) at least one aromatic dicarboxylic acid providing repeating units having the following formula:

$$+X-Y-Q_m-X+$$
$$\phantom{+X-Y-}Q'_n$$

wherein X is a carbonyl group, $n$ and $m$ are integers whose sum equals 1, Q is defined by the formula

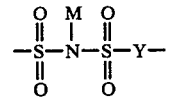

Q' is defined by the formula

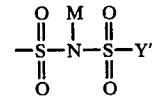

Y is an arylene group or arylidyne group, Y' is an alkyl, aryl, alkaryl or aralkyl group, in which each of the alkyl moieties includes from 1 through 12 carbon atoms, and M is an alkali metal or ammonium cation, said aromatic dicarboxylic acid being represented by the formula:

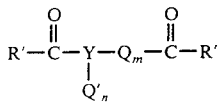

wherein R' is hydroxyl, oxy atom linkage where the compound is an acid anhydride, halogen atom, or an alkoxy radical where the compound is in the form of an ester, and Y, Q, Q', m and n are as defined above;

said condensation polyester being formed in the presence of a combination of (a) at least one hindered phenol having the formula

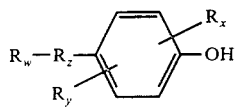

wherein $R_w$ is a functional group capable of participating in ester interchange and polycondensation reactions that occur during formation of said condensation polyester, $R_x$ and $R_y$ are alpha-branched alkyl radicals containing 3–20 carbon atoms, alpha-branched aralkyl radicals containing 7–20 carbon atoms, or cycloalkyl radicals containing 6–20 carbon atoms and $R_z$ is a divalent hydrocarbon radical containing from 1 to 3 carbon atoms; and b) at least one phosphoric acid ester having the formula

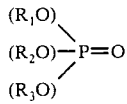

wherein each of $R_1$, $R_2$ and $R_3$ is a hydrocarbon radical having from 6 to 8 carbon atoms, said $R_1O$, $R_2O$ and $R_3O$ groups being capable of participating in ester interchange and polycondensation reactions that occur during the formation of said condensation polyester, said phosphoric acid ester (b) and hindered phenol (a) being present in said combination in a molar ratio which provides

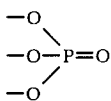

and phenol hydroxy groups in a ratio in the range of from 1:1 to 1:6, respectively, said (a) and (b) compounds being thermally stable and substantially non-volatile at temperatures in the range of from about 250° to about 300° C; and said radiation-sensitive condensation polyester having an inherent viscosity of from about 0.2 to about 1.0 and a polydispersity ratio of from about 1.8 to 3.4.

15. The radiation-sensitive element of claim 14 wherein said hindered phenol is selected from n-octadecyl-3-(3,5-di-t-butyl-4-hydroxyphenyl)propionate; 5,5-bis(5-t-butyl-2,3-dimethyl-4-hydroxybenzyl)dithioterephthalate; 4-hydroxymethyl-2,6-di-t-butyl phenol; 2,6-di-t-butyl-α-dimethylamino-p-cresol; tetrakis-[methylene 3-(3,5-di-tert-butyl-4-hydroxyphenyl) propionate]methane; tetrakis-[methylene 3-(3-tert-butyl-5-methyl-4-hydroxyphenyl)propionate]methane; and a mixture of any two or more thereof; and said phosphoric acid ester is selected from the group consisting of trioctyl phosphate, tri(2-ethylhexyl)phosphate, 2- and 4-tritolylphosphate, 2,2,4-(trimethylpentyl)phosphate, tris-(2,5-dimethylpentyl)phosphate, and a mixture of two or more thereof.

16. The radiation-sensitive element of claim 15 wherein the support is hydrophilic and said element is a lithographic printing plate.

17. The radiation-sensitive element of claim 16 wherein said condensation polyester is formed from di-ethyl-p-benzenediacrylate and 1,4-di-β-hydroxyethoxycyclohexane.

18. The radiation-sensitive element of claim 16 wherein said condensation polyester is formed from di-ethyl-p-benzenediacrylate, 1,4-di-β-hydroxyethoxycyclohexane and dimethyl-3,3'-[(sodio-imino)disulfonyl]dibenzoate.

* * * * *

UNITED STATES PATENT AND TRADEMARK OFFICE
CERTIFICATE OF CORRECTION

PATENT NO. : 4,101,326
DATED : July 18, 1978
INVENTOR(S) : Kenneth T. Barkey

It is certified that error appears in the above-identified patent and that said Letters Patent are hereby corrected as shown below:

Column 18, line 55, change "imimo" to --imino--;
line 56, after 3,3'-, change "]" to --[--;
line 61, change "ylsyulfonyl" to --ylsulfonyl--;
line 64, delete "]" after fonyl.

Column 19, line 56, change "coures" to --course--.

Column 22, line 37, change "yetoxycyclohexane" to --yethoxycyclohexane--.

Column 26, line 54, change "condensatio" to --condensation--.

Column 42, line 29, after "formula" insert
$$--(\!\!-R_s-\overset{\overset{O}{\|}}{C}-\!\!)\!\!-,--;$$
line 45, change "polycoden-" to --polyconden--.

Column 46, line 8, after "tri(2-ethylhexyl" insert --)--;
line 26, change "containig" to --containing--.

Signed and Sealed this

Nineteenth Day of December 1978

[SEAL]

Attest:

RUTH C. MASON
Attesting Officer

DONALD W. BANNER
Commissioner of Patents and Trademarks